United States Patent
Barbosa da Torre et al.

(10) Patent No.: US 7,308,268 B2
(45) Date of Patent: Dec. 11, 2007

(54) METHOD AND SYSTEM FOR SIMULATION AND MANAGEMENT OF THE RESOURCES OF A MOBILE TELEPHONE NETWORK

(75) Inventors: Serge Barbosa da Torre, Paris (FR); Rabih Chrabieh, San Diego, CA (US); Imad Fattouch, Paris (FR)

(73) Assignee: Societe Francaise du Radiotelephone, Paris (FR)

( * ) Notice: Subject to any disclaimer, the term of this patent is extended or adjusted under 35 U.S.C. 154(b) by 0 days.

(21) Appl. No.: 11/559,686

(22) Filed: Nov. 14, 2006

(65) Prior Publication Data
US 2007/0149186 A1    Jun. 28, 2007

(30) Foreign Application Priority Data
Nov. 14, 2005    (FR) ................................... 05 11508

(51) Int. Cl.
*H04Q 7/36* (2006.01)
(52) U.S. Cl. ...................................... 455/446; 455/445
(58) Field of Classification Search ................ 455/445, 455/446
See application file for complete search history.

(56) References Cited

U.S. PATENT DOCUMENTS

| | | | |
|---|---|---|---|
| 5,465,390 A * | 11/1995 | Cohen | 455/446 |
| 5,561,841 A * | 10/1996 | Markus | 455/446 |
| 6,336,035 B1 * | 1/2002 | Somoza et al. | 455/446 |
| 6,459,895 B1 * | 10/2002 | Hastings et al. | 455/424 |
| 6,539,228 B1 * | 3/2003 | Tateson | 455/446 |
| 6,636,743 B1 * | 10/2003 | Vicharelli et al. | 455/446 |
| 6,876,856 B2 * | 4/2005 | Fattouch | 455/446 |

* cited by examiner

Primary Examiner—Harry S. Hong

(57) ABSTRACT

A method and a system for simulating and optimising the operating resources available in a coverage area of a mobile telephone network implemented by processing resources of at least one resource optimisation system and, can include definition, by an event-management module of the optimisation system, of a variation, called a perturbation, of at least one transmission of packets required within the network, from at least one statistical distribution map, selection of a set of cells determining a simulated zone, by means of an operating-resource control module, and then use of a routing algorithm to determine a routing path in the simulated zone, and to successively optimise the resources of the servers, definition by the event-management module, of data that represent at least one parameter relating to the transmission of the packets within each of the cells in the simulated zone, from amongst at least parameters of time-multiplexing of the packet, code-multiplexing of the packet, and the power required.

Figure 1:
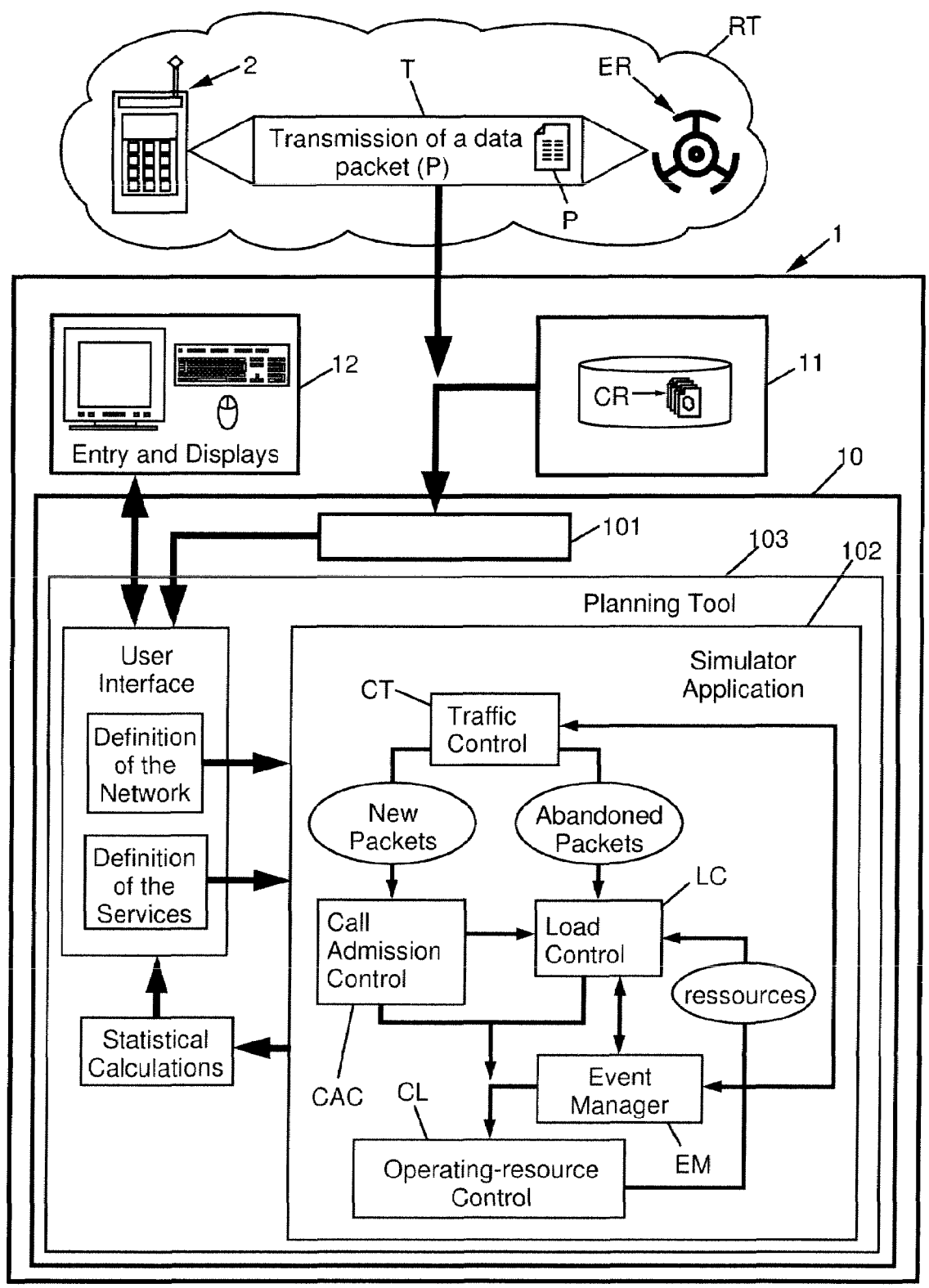

45 Claims, 11 Drawing Sheets ns applications.

METHOD AND SYSTEM FOR SIMULATION AND MANAGEMENT OF THE RESOURCES OF A MOBILE TELEPHONE NETWORK

CROSS-REFERENCE TO RELATION APPLICATIONS

This application claims priority from French Patent Application No. 05 11508 filed on Nov. 14, 2005.

The disclosed embodiments concern the area of mobile telephony, and in particular the third generation (3G) mobile telephone networks such as the communication systems of the Universal Mobile Telecommunications System type (UMTS) for example, as specified by the Third Generation Partnership Project (3GPP) standard.

A problem in the general area of mobile telephony is radio resource management (RRM) according to the topology of the networks and of their use by the subscribers. In fact, mobile telephone networks necessitate management of the radio resources used, at least in the downlink direction, that is to say from the transmitters to the mobile terminals present in their zone of influence. This problem is further complicated by the development of the new telecommunication technologies and in particular with the arrival of the third generation systems offering the ability to subscribers to use their mobile terminals as terminals for browsing the internet, with a bandwidth of the order of one megabyte per second. In these systems, the rates of transmission within a cell of the network vary enormously and rapidly according to the use of the different services by the users. It is therefore important to allow an efficient dynamic management of the throughput (data rate or data speed through the network) transiting via the transmitters for the different mobile terminals present in their zone of influence, and to supervise the quality of the services provided.

In the mobile telephony systems of the Global System for Mobile Communication (GSM) generation, the data transmitted by radio are organised into data frames that are divided into a multiplicity of time intervals allowing as many users to employ the same frequency for their communication by means of their mobile communication terminal. This division of the data frames, allowing a multiplexing of the signals in time is called Time Division Multiple Access (TDMA).

In the third generation systems, the data can be transmitted by means of different codings that allow a multiplicity of mobile terminals to use a given radio frequency but with different codes. This technology, called Code Division Multiple Access (CDMA), consists of multiplexing the signals by means of codes. Modern telephone networks can use both types of division of the radio frequencies for transmission of the data. For example, the Time Division Duplex (TDD) type UMTS systems use the Time Division—Code Division Multiple Access (TD-CDMA) technology. Certain developments of the UMTS system, such as the Wide-Band Code Division Multiple Access (WCDMA) and High-Speed Downlink Packet Access (HSDPA) technologies, can be used to achieve wide bandwidths for the transmission of data, at least in the downlink direction. Modern mobile telephone networks use the packet switched (PS) technology, over the Internet, and according to which the data are transmitted by packets formed from a set of data transiting at the same time and in which certain data constitute a header, used to route, and therefore to address, the packet to its target through the network, for example of the General Packet Radio Service (GPRS) type. The mobile telephone networks also use the circuit switched technology for transiting the data corresponding to the audio information necessary for telephone communications through the network. Managing the resources of modern mobile telephone networks must therefore not only include management of the time-division of the data transmission frame but also of the division by coding, as well as of the switching method (packet switched or circuit switched) used for transiting the packets within the network.

Finally, modern mobile telephone networks necessitate management of the power of the transmitters not only according to the number of users' mobile terminals present in their zone of influence, and according to the distance separating these terminals from the transmitters, but also according to the use of the different types of services, in terms of the drain on the resources offered by the telephone operators to the users of mobile terminals.

Some solutions, known from prior art, allow statistical prediction of the traffic within a network, such as by means of the Monte Carlo method for example, but these static simulation solutions do not allow for the dynamic temporal aspect of the communications established within the network, since they are based on iterations of statistical estimates of the traffic at different times. These solutions do not allow Call Admission Control (CAC), that is to say control of the acceptance or refusal of the calls according to the use of the transmitters' resources. Furthermore, neither do these solutions allow Load Control (LC), namely control of the use of the support transmission paths, called "bearer" (B), available for communications within a cell covered by a transmitter. Finally, these solutions do not allow control of the throughput offered to the various users of communicating terminals present in a cell covered by a transmitter in the network.

Some other solutions, also known from prior, consist of the dynamic simulation of communications within a mobile telephone network. These solutions have the advantage of simulating reality but have the drawback of being limited to a set of 30 or 40 cells since they necessitate many parameters and therefore vast calculation resources. These solutions are therefore too costly to implement, and unusable in an operational network (already deployed).

It would be advantageous to overcome the drawbacks of previous designs. One embodiment proposes a method for simulating and optimising the operating resources of a mobile telephone network that requires lower calculation capacity for its implementation, and that allows dynamic control, according to the traffic, of all the resources of the network, and use of the different types of services offered to the users of communicating terminals present in the area of coverage of the network, as well as supervision of the quality of the services offered.

In one aspect, this can be attained by a method for simulating and optimising the operating resources available in a coverage area of a mobile telephone network consisting of a set of zones of influence, called cells, of a plurality of transmitters/receivers, called servers, whose operating resources depend on the transmission of data sets, called packets, required by at least one communicating mobile terminal, called the applicant terminal, present in their zone of influence, wherein, firstly, it is implemented by processing resources of at least one resource optimisation system and, secondly, it includes the following stages:

definition, by an event-management module of the optimisation system, of a variation, called a perturbation, of at least one transmission of packets required within the network, where this perturbation is determined from at least one statistical distribution map held in storage resources of the optimisation system and including data that represent the data packet transmissions of a plurality of mobile terminals present in a given geographical zone during a given time-slice, selection of a set of cells that includes at least the cell in which the perturbation occurs, and that defines a simulated zone within the distribution map by means of an operating-resource control module, and then use of a routing algorithm, ran by the operational control module, to determine a routing path of the simulated zone, and to successively optimise the resources of the servers covering the successive cells on the routing path, definition, by the event-management module, of data that represent at least one parameter relating to the transmission of the packets within each of the cells in the simulated zone, from amongst at least parameters of time-multiplexing of the packet, code-multiplexing of the packet, and power required.

According to another particular feature, the stage for definition of at least one parameter from the time-multiplexing of the packet, the code-multiplexing of the packet and the power required, by the event-management module, includes at least one of the following stages:

determination of time-slices, called time-slots or subframes, allowing multiplexing in time of the packets in the course of at least one frame of transmission, determination of codes allowing multiplexing by codes of the packets in the course of at least one frame of transmission, determination of the power allocated to each of the packets in the course of at least one frame of transmission, determination of a type of time-slot used for the transmission of packets according to the different service types provided by the servers, where this type of time-slot is either a "full-rate" time-slot, or a "half-rate" time-slot, or a "packet-only" time-slot, or a "mixed" packet and circuit time-slot.

According to another particular feature, the stage of determination of codes includes a stage for determining the number of codes attributed to each of the packets and a stage for determining the type of modulation used for these codes.

According to another particular feature, the stages for determining the time-slots, for determining the codes and for determining the power, are implemented, for each of the packets, by a packet scheduling module used to determine the codes and the time-slots by means of which each of the packets will be transmitted in the course of at least one frame of transmission, as well as the power allocated to each of the packets.

According to another particular feature, the stage for determining the time-slots is replaced by a stage for the evaluation of a portion of time occupied by the transmission of each of the packets, with no determination of time-slots but considering only the total time during which each of the packets is transmitted.

According to another particular feature, the stage for the evaluation of the time portion occupied by the transmission of each of the packets is based upon an approximation that consists of a calculation of the average power used during the time for the transmission of each of the packets, and of a smoothing of the power over the total time portion occupied by each of the packets, through the use, by the event-management module, of at least one algorithm from amongst the following algorithms for time distribution of the packets:

an individual transmission algorithm, according to which a single packet is transmitted in the course of each of the time-slot, then using all of the power available during this time-slot, a grouped transmission algorithm, according to which a plurality of packets is transmitted during a given time portion, by multiplexing by codes, these packets each using a portion of the total available power.

According to another particular feature, the method includes a stage for determination of the interference perceived by each of the servers responsible for the transmission of each of the packets during the time portion in the course of which they are transmitted, where this stage is implemented by means of the stage for determination of the power allocated to each of the packets in the course of at least one frame of transmission and by use of the algorithms for time distribution of the packets by the event-management module, with this determination of the perceived interference allowing the calculation of a signal-to-noise ratio for each of the packets.

According to another particular feature, the use of the grouped transmission algorithm by the event-management module is accompanied by a stage for the allocation of different time portions to the different packets transmitted in the course of a frame of transmission, by the use of an algorithm from amongst the following algorithms for the allocation of a time portion:

a "fair-share" algorithm, according to which the time portion allocated to each of the packets is a function of the total time of the frame of transmission divided by the number of packets to be transmitted, a maximising algorithm, according to which the time portion allocated to each of the packets is a function of a value of at least one parameter relating to the transmission of the packet divided by the sum of the values of this parameter or these parameters for the other packets.

According to another particular feature, it includes a preliminary stage for the establishment of at least one distribution map including data that represent the traffic and the location of servers in the coverage area of the network, where these data representing the traffic are quantitative and qualitative measurements of the location of a plurality of mobile terminals and servers operating in the coverage area of the network and of the data packet transmissions effected in the course of time-slices chosen for their statistical significance, where the data corresponding to these measurements are held in the storage resources of the optimisation system.

According to another particular feature, it includes a stage for the establishment of at least one distribution map including data that represent the traffic and the location of servers in the coverage area of the network, with the data that represent the traffic being generated by the event-management module and representing, firstly, the location of a plurality of mobile terminals distributed randomly in the coverage area of the network at a predetermined density and, secondly, the data packet transmissions required by these terminals assigned randomly to the different terminals present in the network, from random laws stored in the storage resources of the optimisation system.

According to another particular feature, it includes a stage for the recording, in the storage resources of the optimisation system, of at least one routing algorithm allowing the operating-resource control module to determine a routing path consisting of the selection of any cell in the simulated zone and then a plurality of iterations for the selection of a cell adjacent to the cell selected previously, until all the cells in the simulated zone have been successively selected in ascending order of their distance in relation to the first cell selected.

According to another particular feature, it includes a stage for the recording, in the storage resources of the optimisation system, of at least one routing algorithm determining concentric circles centred on the cell in which the perturbation occurs and allowing the operating-resource control module to determine a routing path consisting of successive selections of the cells in the simulated zone through which these concentric circles pass in ascending order of the distance of these cells in relation to the first cell selected.

According to another particular feature, the stage for the use of the routing algorithm by the operating-resource control module is accompanied by a stage for the creation of data that represent a grid for separation of the simulated zone into divisions, each including an index obtained from the coordinates of the cells, used to locate each of the divisions and to classify them in ascending order of their distance in relation to a central division.

According to another particular feature, the stage for the use, by the operating-resource control module, of a routing algorithm results in the determination of concentric circles centred on the cell in which the perturbation occurs, and is accompanied by a stage for determining a routing path that includes at least one vector indicating the path to be followed from one division to the next within the simulated zone, in order to allow successive selections of the divisions of the simulated zone through which these concentric circles pass, and successive selections of the cells contained in each of these divisions in ascending order of their distance in relation to a central division.

According to another particular feature, the data that represent the grid for separation of the simulated zone into divisions includes data that represent the coordinates of the division allowing the operating-resource control module to determine the location of the cells, as well as the divisions and neighbouring cells.

According to another particular feature, the stage for the use of the routing algorithm by the operating-resource control module is accompanied by a stage for the creation, for each cell in the simulated zone, of data that represent the neighbouring cells in the simulated zone, so as to determine a routing path for each of the cells, one after the other.

According to another particular feature, the routing path in the cells within a division is determined in a random manner.

According to another particular feature, the stage for the use of the routing algorithm by the operating-resource control module is accompanied by the creation, for each cell in the simulated zone, of data that represent a marker indicating the cells already visited during the passage through the simulated zone by the operating-resource control module.

According to another particular feature, the stage for definition of the perturbation consists of the random and automatic selection of a communicating mobile terminal in a distribution map extracted from the storage resources of the optimisation system and in that the stage for the selection of a set of cells determining a simulated zone within the distribution map consists of selecting at least one server whose cell can cover the location at which this terminal is located in the distribution map.

According to another particular feature, the stages for definition of the perturbation and for selection of a set of cells determining a simulated zone within the distribution map, consist of the selection of a communicating mobile terminal present in the coverage area of the network and of at least the servers whose cells can cover the position at which this terminal is located in the distribution map, from information entered and recorded by a user of the resource optimisation system, by means of interactive resources between the user and the resource optimisation system.

According to another particular feature, firstly, the stage for definition of the perturbation is implemented during a request for the transmission of a data packet by an applicant mobile terminal present in the coverage area of an operational mobile telephone network, and consists of the location of the communicating mobile applicant terminal in the coverage area of the network and identification of the type of transmission that it requires and, secondly, the stage for the selection of a set of cells determining a simulated zone within the distribution map consists of selecting at least one server whose cell can cover the location at which this terminal is located in the distribution map.

According to another particular feature, the stage for definition of data that represent at least one parameter relating to the transmission of the packets is implemented by the resource optimisation system, either in a random and automatic manner, or from information entered and recorded by a user of the resource optimisation system, or from transmission parameters required by a communicating mobile terminal during a transmission request.

According to another particular feature, the stage for definition of the perturbation by the event-management module includes at least one of the following stages:
- a request for a new transmission, handled by an event control module,
- the ending of a transmission, handled by the event control module,
- the expiry of a transmission timeout, handled by the event control module,
- simulation of the mobility of the communicating mobile terminal responsible for the perturbation, handled by a mobility simulation module,
- changing of the transmissions of current packets, handled by a packet-scheduling module.

According to another particular feature, the stage for simulating the mobility of the communicating mobile terminal responsible for the perturbation consists of one of the following stages:
- modelling a speed of movement of the communicating mobile terminal by changing the required signal-to-noise ratio, which allows modelling of the level of losses or of the gain due to variations in the strength of the signal perceived by the mobile communicating terminals, or
- changing the location of the communicating mobile terminal in the distribution map by selection of a neighboring communicating mobile terminal in the map.

According to another particular feature, it includes a stage for controlling the traffic between the servers of the simulated zone and the mobile terminals present in the simulated zone, implemented by a traffic control module of the optimisation system determining, for each of the current transmissions, sessions for the transmission of packets, the support transmission path, called bearer and the transmission channels of these packets, this stage being accompanied by at least one of the stages for determination of the multiplexing and power parameters.

According to another particular feature, the stage for the control of traffic by the traffic control module of the optimisation system consists of determining a plurality of parameters relating to the services and to the resources used by the mobile terminals present in the simulated zone, where this determination results from at least one stage for the extraction of data that represent these parameters, from a distribution map, and of a possible stage for the creation of data that represent these parameters, from information entered by a user of the optimisation system, so as to allow at least one of the following stages:

determination of sessions corresponding to transmissions of data packets between the servers of the simulated zone and each of the mobile terminals present, with determination of the packets transiting in the course of the sessions;

determination of at least one bearer associated with each of the transmissions of each of the mobile terminals, with determination of at least one parameter from the parameters relating to the type of the bearer, the throughput (data rate) of the bearer, the quality of the signal required, the transmission channels used for each of the cells, and the range of authorised power levels.

According to another particular feature, it includes a stage for controlling the acceptability of the transmission of this packet, by a call admission control module of the resource optimisation system performing a determination of a set, called the active set, of cells available within the simulated zone, by verification of the availability, in the simulated zone, of at least one parameter from amongst the power, the channels and the parameters for multiplexing by codes and by time or the type of time-slots employed, and then classification of the servers of the active set according to their contribution (Ec/lo) to the total power of the signals exchanged with the communicating mobile terminal, with the call admission control module then making a decision, according to the traffic, about the acceptability of the transmission of this packet via at least one support transmission path, called the bearer, and at least one channel for transmission of the packet via at least one server covering one of the cells in the active set.

According to another particular feature, it includes an operating-resource control stage, implemented by the operating-resource control module of the optimisation system during a variation in the number of packets transmitted within the simulated zone, and consisting of verifying at least one parameter used by the mobile terminals in the cells constituting the simulated zone from amongst at least the power and the parameters for multiplexing by codes and by time or the type of time-slots employed, and then adjusting this parameter or these parameters for at least one server covering at least one cell in the simulated zone.

According to another particular feature, it includes a load control stage for each of the cells in the simulated zone, implemented by a load control module of the optimisation system, in the event of excessive use of the resources of at least one server of the simulated zone, consisting of the use of at least one load control algorithm from amongst at least one constant-power load control algorithm and at least one variable-power load control algorithm held in the storage resources of the optimisation system and including the following stages:

verification of the resources used, at the level of at least one parameter from amongst the power, the channels used and the multiplexing parameter by codes and by the time or the type of time-slots employed, in the cells constituting the simulated zone, to select at least one server whose resources are being used excessively;

selection of at least one packet from amongst the packets, called excess packets, using the maximum of power or using a maximum throughput (data rate) on the transmission channels between the mobile terminals present and the server whose resources are being used excessively;

a decision between refusal of the selected excess packet and downgrading of the transmission parameters of the selected excess packet.

According to another particular feature, the decision stage between refusal of the selected excess packet and downgrading of the transmission parameters of the selected excess packet, during the load control stage by the load control module, depends on the load control algorithm used and includes the following stages:

verification of the switching method, by circuit or by packet, used by the selected excess packet;

verification of the parameters of the bearer used by the selected excess packet;

verification of a list of servers of the active set classified according to their contribution (Ec/lo) to the total power of the signals exchanged with the communicating mobile terminal, to determine whether there exists another server capable of allowing transmission of the selected excess packet, when the power of the signal supplied by a server is insufficient.

According to another particular feature, the decision stage between refusal of the selected excess packet and downgrading of the transmission parameters of the selected excess packet, during the stage to control the loading, by the use of at least one constant-power load control algorithm, consists of holding constant the power initially allocated to the packets during the whole period of their transmission, and downgrading of the parameters for multiplexing by codes in accordance with the instantaneous signal-to-noise ratio, so as to reduce the throughput of the selected excess packet while keeping the signal-to-noise ratio above its required value, or in a refusal of the selected excessive packet if the required signal-to-noise ratio cannot be maintained.

According to another particular feature, the decision stage between refusal of the selected excess packet and downgrading of the transmission parameters of the selected excess packet, during the load control stage, by the use of at least one variable-power load control algorithm, consists:

either of downgrading of both the code-type multiplexing parameters initially allocated to the packets and the power parameters, in accordance with the instantaneous signal-to-noise ratio, so as to reduce the throughput of the selected excess packet while keeping the signal-to-noise ratio above its required value, or, when the power cannot be regulated, of downgrading only the parameters for multiplexing by codes in accordance with the instantaneous signal-to-noise ratio, so as to reduce the throughput of the selected excess packet while keeping the signal-to-noise ratio above its required value, or of refusal of the selected excessive packet if the required signal-to-noise ratio cannot be maintained.

According to another particular feature, it includes a stage to control the load of each of the cells in the simulated zone, implemented by a load control module of the optimisation system, by the use of at least one time-slot load control algorithm, either when a mixed time-slot is used only for the transmission of a circuit-switched packet while it normally allows either the transmission of both packet-switched packets and circuit-switched packets, or when a packet is abandoned, where this load control stage consists of allocating fairly shared resources to all of the packets in the process of transmission, according to the capacity of the communicating mobile terminals responsible for these transmissions, and possible refusal of the most recent packet if the number of packets being transmitted exceeds a predetermined value.

According to another particular feature, it includes a stage to control the load of each of the cells in the simulated zone, implemented by a load control module of the optimisation system, during a reduction in the use of the resources of at least one server of the simulated zone, consisting of the use of at least one load control algorithm held in the storage resources of the optimisation system, and including the following stages:

verification of the resources used, at the level of at least one parameter from amongst the power, the channels used and the parameters for multiplexing by codes and by time or the type of time-slots employed, in the simulated zone, to detect at least one server that has unused resources;

selection of at least one packet from amongst the packets, called disadvantaged packets, using a minimum throughput on the transmission channels of the server that has under-used resources;

upgrading of the transmission parameters of the selected disadvantaged packet, by increasing the value of at least one parameter of the bearer used by this selected disadvantaged packet until a satisfactory operating level is attained, as determined in the load control algorithm.

According to another particular feature, the stage to control the loading of each of the cells in the simulated zone is associated with a stage for the detection of any oscillations between two values of at least one parameter of the bearer used by a packet in the process of reconfiguration by the load control module and, where appropriate, attributing the minimum value attained by the oscillation to this parameter.

According to another particular feature, the stage to control the load of each of the cells in the simulated zone is implemented by activation of the load control module by the operating-resource control module, in order to improve the quality of the transmission of the packets of the different mobile terminals present in at least one cell in which the perturbation occurs, as determined by the event-management module.

According to another particular feature, the stage to control the load of each of the cells in the simulated zone is implemented by automatic activation of the load control module, when the power required by a channel for the transmission of a packet increases beyond an authorised maximum, and consists of automatic selection of this packet as an excess packet and then downgrading of the transmission parameters of this selected excess packet.

According to another particular feature, the stage for controlling the acceptability of the transmission of the packet of the applicant mobile terminal consists of the use, by the call admission control module, of at least one admission control algorithm from amongst at least one coding-determined admission control algorithm and at least one time-slot-determined admission control algorithm, held in the storage resources of the optimisation system and includes the following stages:

determination of the active set of cells available for the transmission of the packet of the applicant terminal, by measurement and classification of a plurality of servers of the simulated zone, whose number depends on the location and the type of the applicant terminal;

verification of the availability of resources, for each of the cells in the simulated zone, at the level of at least one parameter from amongst the power, the channels and the parameters for multiplexing by codes and by time or the type of time-slots employed, and then classification of the servers of the active set according to their contribution (Ec/Io) to the total power of the signals exchanged with the communicating mobile terminal;

determination of the power required by the transmission channels of the packet for each of the cells, and verification that this power required by each of the cells does not exceed the maximum power of the bearer determined for the transmission of the packet of the applicant terminal;

verification that the status of at least one of the cells allows the acceptance of transmissions of data by a new communicating mobile terminal.

According to another particular feature, the use, by the call admission control module, of at least one coding-determined admission control algorithm results in a decision, according to the traffic, on the acceptability of the transmission of the packet of the applicant mobile terminal, where this decision consists of one of the following stages:

acceptance of the transmission of the packet of the applicant terminal, when the conditions necessary for the acceptance of a new transmission have been satisfied, after selection of a server for the transmission of the packet and selection of the bearer to be used for this transmission, with allocation of the highest possible initial coding parameters in the server, according to the number of channels available and the power required, and then allocation of an initial time portion;

refusal of the transmission of the packet of the applicant mobile terminal by the server, when the number of channels available is insufficient or when the power required is too high, even for the lowest coding parameters available on the server.

According to another particular feature, the use, by the call admission control module, of at least one time-slot-determined admission control algorithm, results in a decision, according to the traffic, on the acceptability of the transmission of the packet of the applicant mobile terminal, where this decision consists of one of the following stages when the packet is using circuit-switching:

acceptance of the transmission of the packet of the applicant terminal, when the conditions necessary for the acceptance of a new transmission have been satisfied, after selection of a server for the transmission of the packet and selection of the bearer to be used for this transmission with allocation of a time-slot of the full-rate type if such a time-slot is available on the server or allocation of a time-slot of the half-rate type reconfiguration by the use of at least one reconfiguration algorithm of the transmission of data when the conditions necessary for the acceptance of a new transmission have not been satisfied and the storage resources of the optimisation system are holding at least one reconfiguration algorithm, in order to allow a modification of the data relating to the bearer, and to increase the chances of acceptance of the transmission;

refusal of the transmission of the packet of the applicant mobile terminal, when the conditions necessary for acceptance have not been satisfied and the storage resources of the optimisation system are storing no reconfiguration algorithm, or the traffic within the simulated zone does not allow effective reconfiguration of the transmission of the packet.

According to another particular feature, the stage for reconfiguration by the use of at least one algorithm for reconfiguration of the transmission of the packet, implemented by the call admission control module when the conditions necessary for the acceptance of a new transmission, determined by the time-slot-determined admission control algorithm, have not been satisfied, and the storage resources of the optimisation system are holding at least one reconfiguration algorithm, results in:

either a search for a call to which a time-slot of the full-rate type is allocated, and then, where appropriate, allocation of a slice of the half-rate type to this call and allocation to the new transmission of the time-slot of the full-rate type thus freed;

or a search for a time-slot of the mixed type, and, where appropriate, allocation of this mixed time-slot to the new transmission, and then adaptation of this mixed time-slot to the new circuit-switched transmission.

According to another particular feature, the use, by the call admission control module, of at least one time-slot-determined admission control algorithm results in a decision, according to the traffic, on the acceptability of the transmission of the packet of the applicant mobile terminal, where this decision consists of one of the following stages when the packet is using packet-switching:

the search for a transmission block consisting of a combination of time-slots of the packet-only type and time-slots of the mixed type in a bearer and then, where appropriate, acceptance of the transmission of the packet of the applicant terminal and allocation of this block to the new transmission;

the refusal of the transmission of the packet of the applicant mobile terminal, when no transmission block is available for acceptance of the new transmission.

According to another particular feature, it is implemented by an application for the simulation and optimisation of resources, executed on the processing resources of the resource optimisation system and controlling the processing resources and the interoperability of the traffic control module, of the admission control module, of the load control module and of the operating-resource control module, and accessing the storage resources of the optimisation system in order to load the data necessary for the different modules, where the process includes a stage for installation of the application on the optimisation system by the recording, in the storage resources of the optimisation system, of data allowing execution of the application on the processing resources of the optimisation system.

According to another particular feature, the stage for installation of the application on the optimisation system includes a stage for implementation of the optimisation application within a software environment supplied by a cell planning application executed on the processing resources of at least one server within the coverage area of the network, by the recording, in storage resources of the server, of data allowing execution of the application for optimisation of the resources within the cell planning application of the server which thus constitutes an optimisation system.

According to another particular feature, the stages for definition of the perturbation and selection of a simulated zone are accompanied by a stage for loading into a working memory, of the volatile or very fast access type, of the resource optimisation system, of at least certain data stored in the storage resources of the optimisation system.

Figure 2:
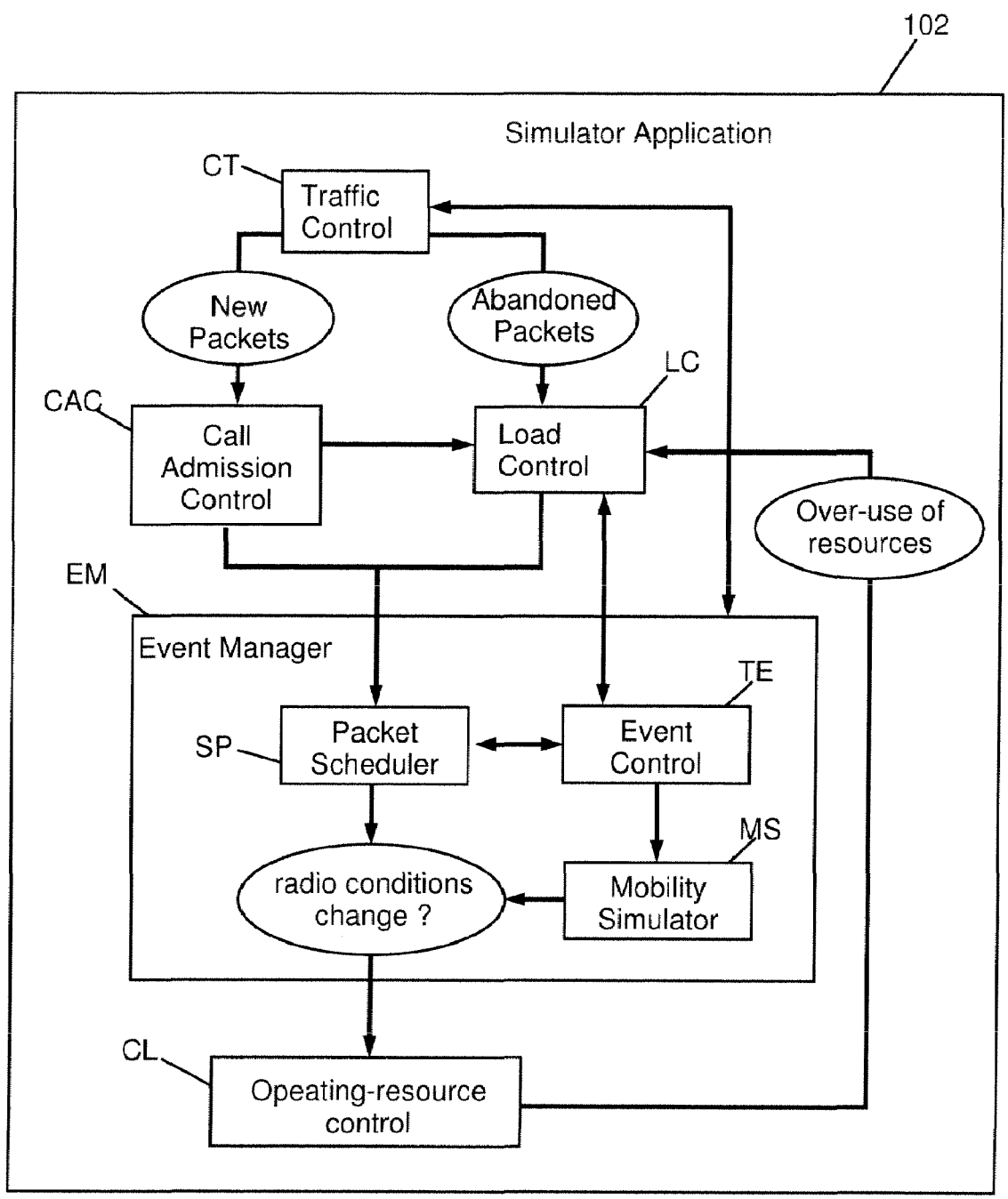
Figure 3:
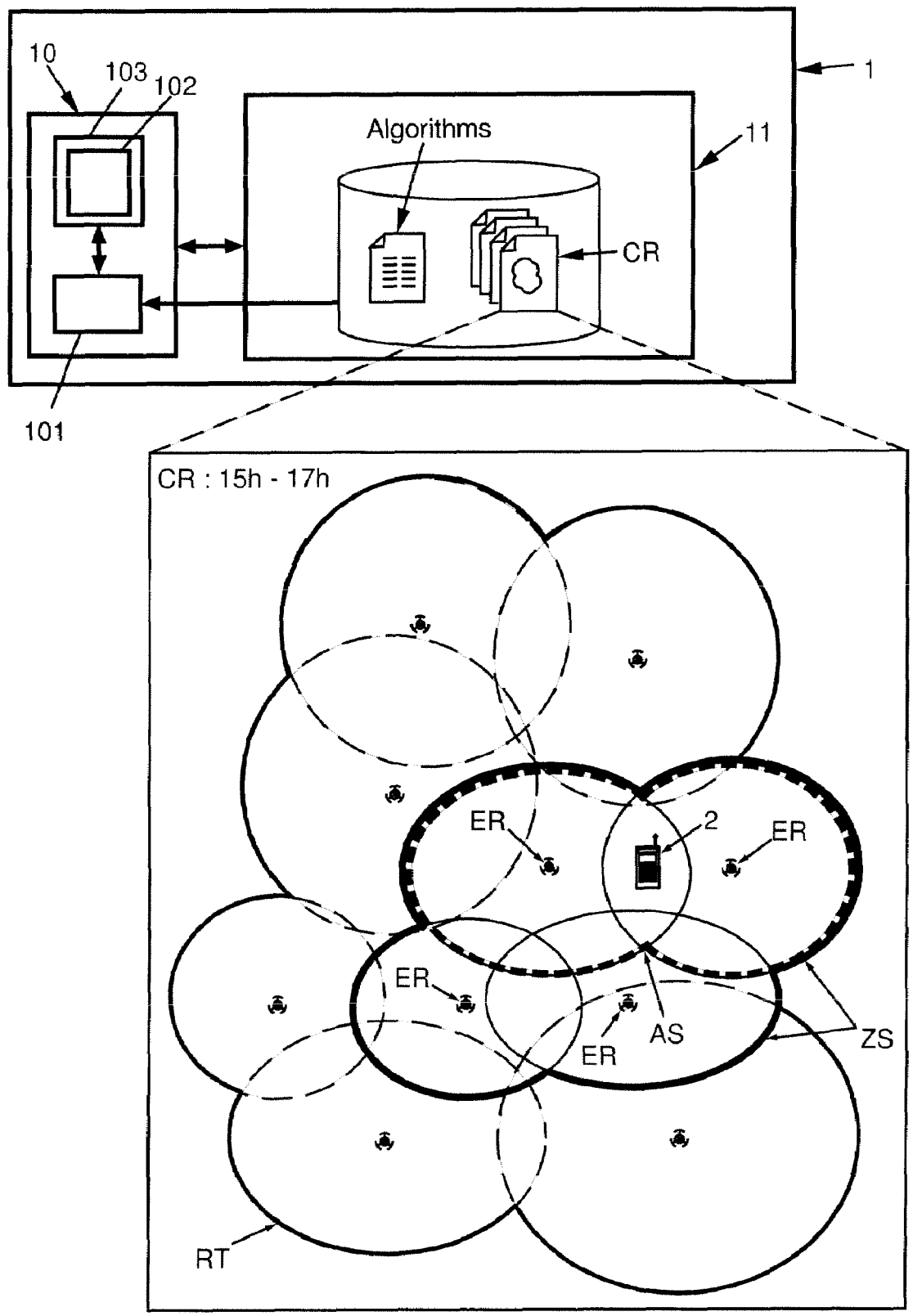
Figure 4:
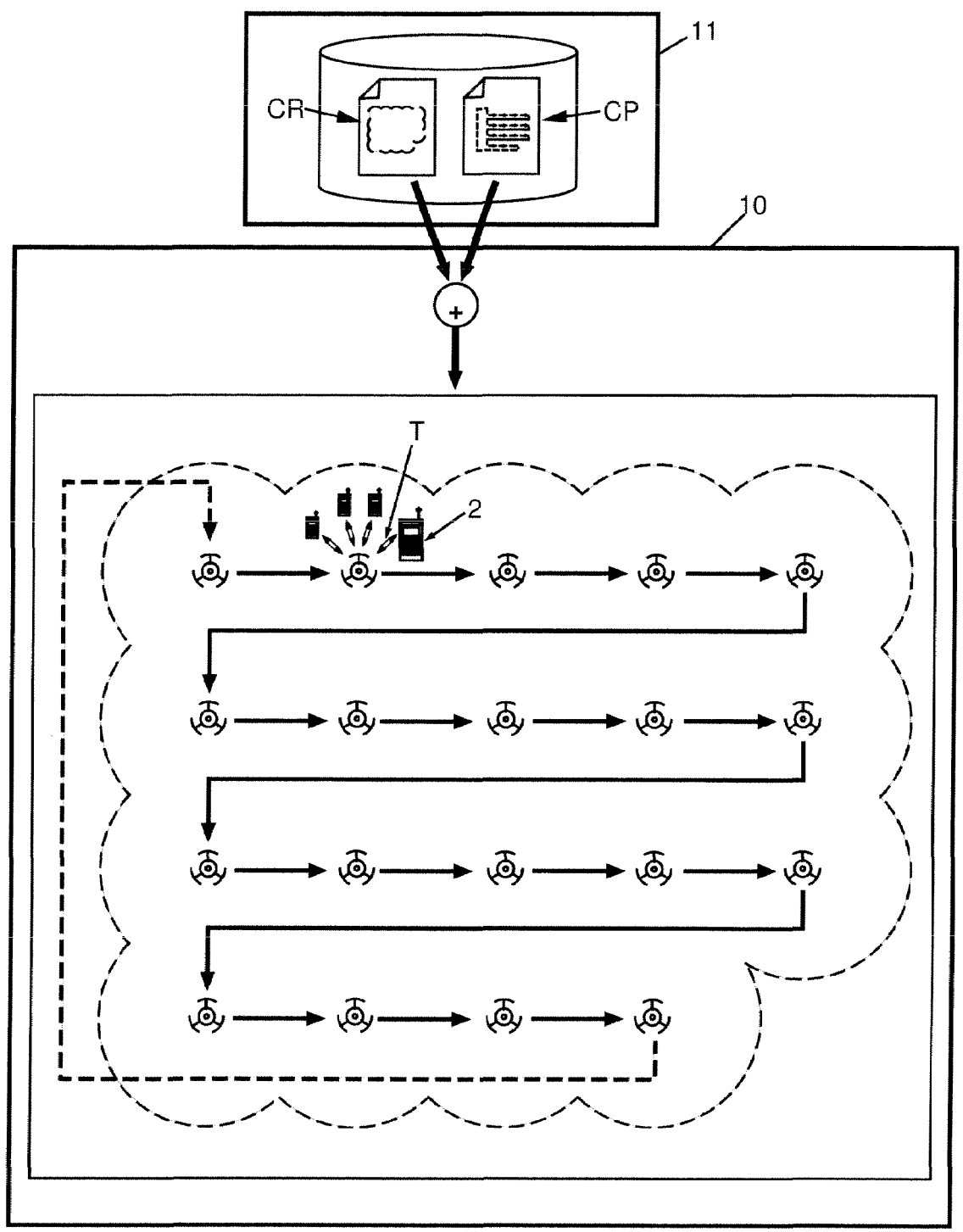
Figure 5A:
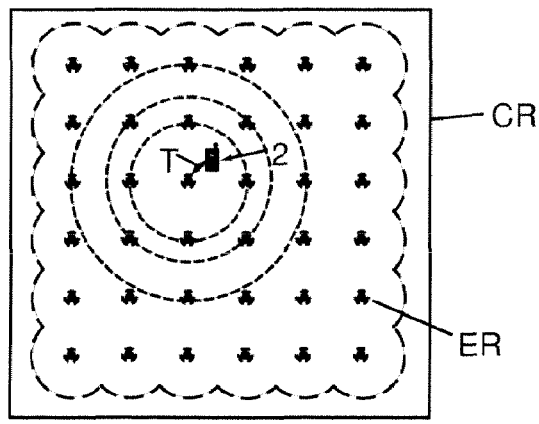
Figure 5B:
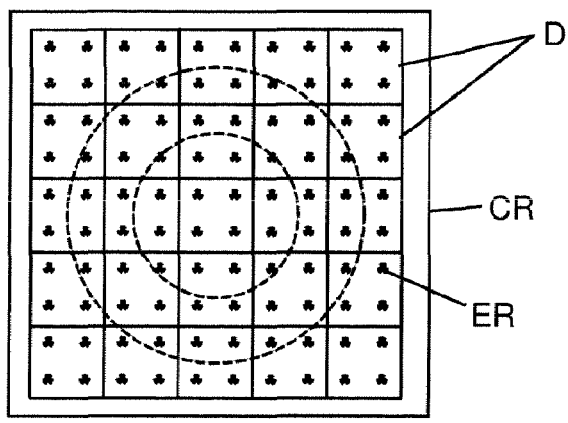
Figure 5C:
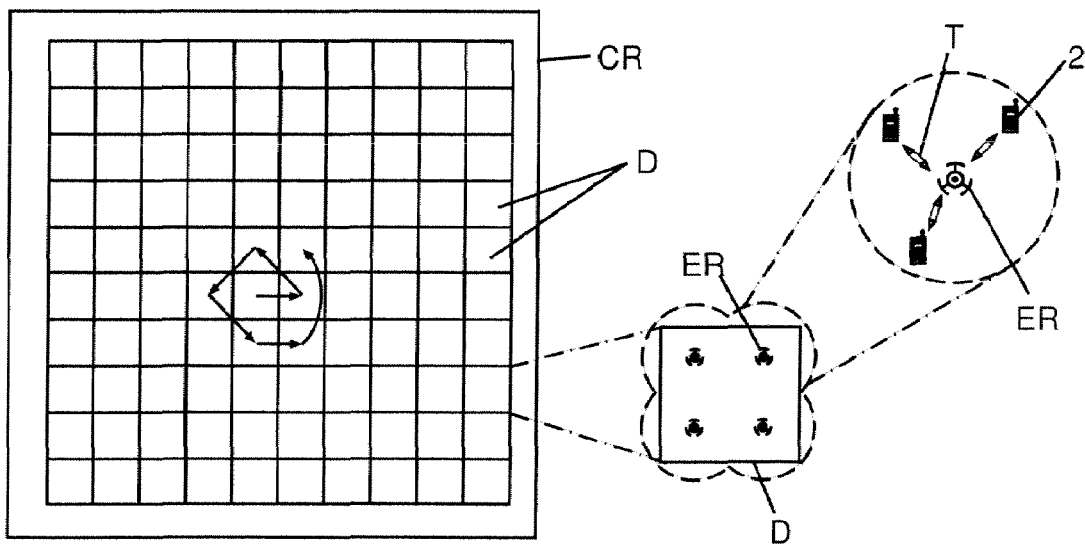
Figure 6:
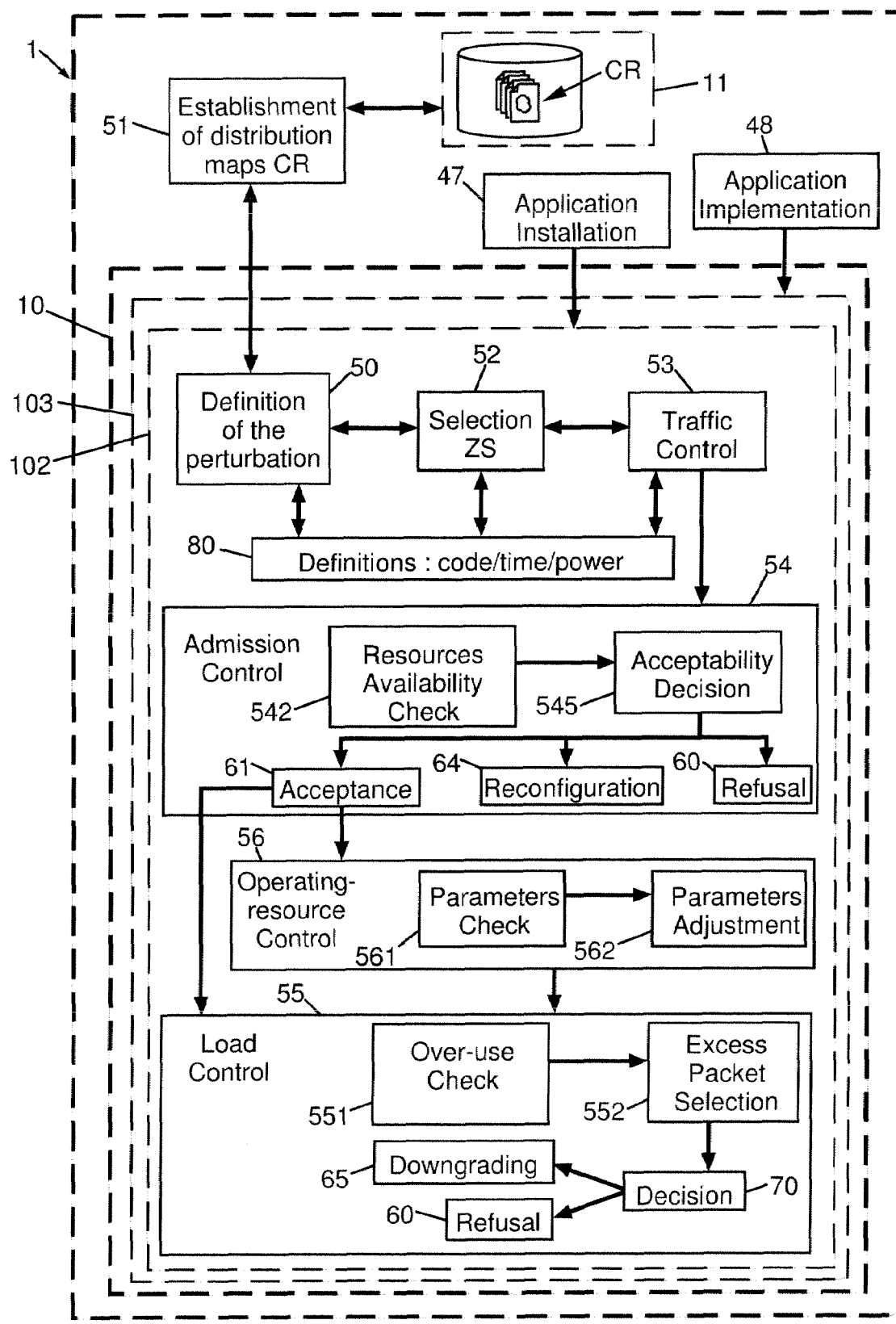
Figure 7:
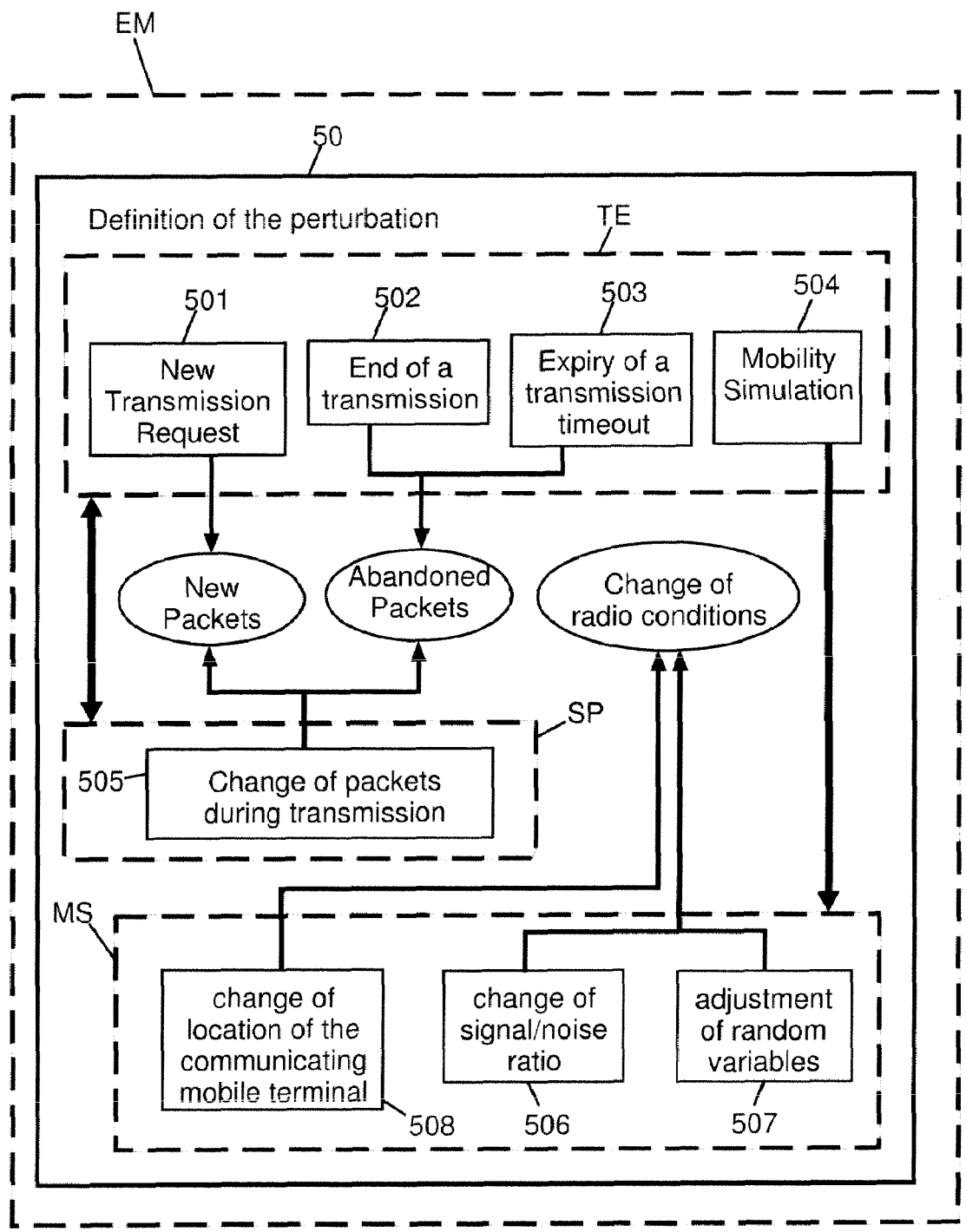
Figure 8:
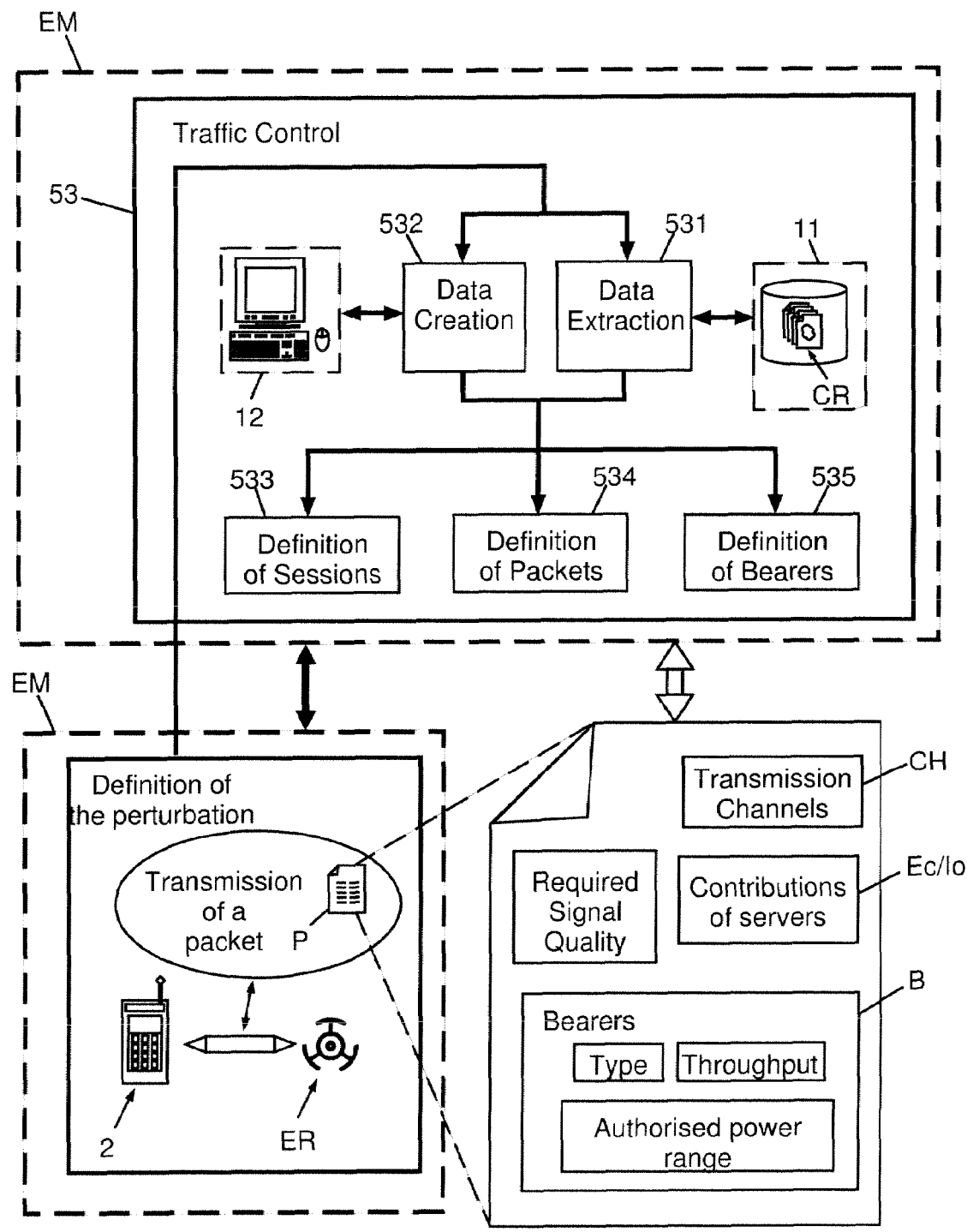
Figure 9:
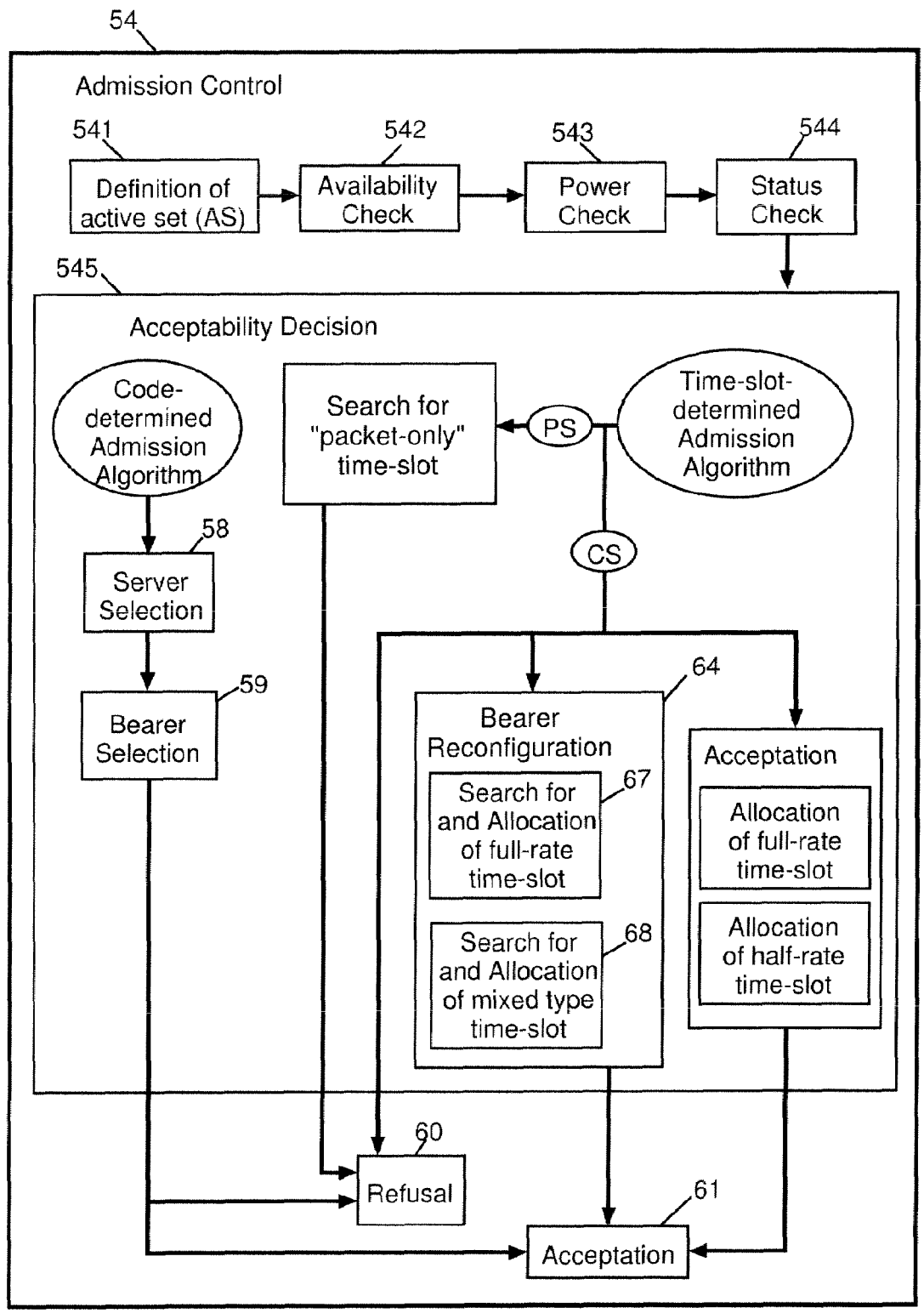
Figure 10:
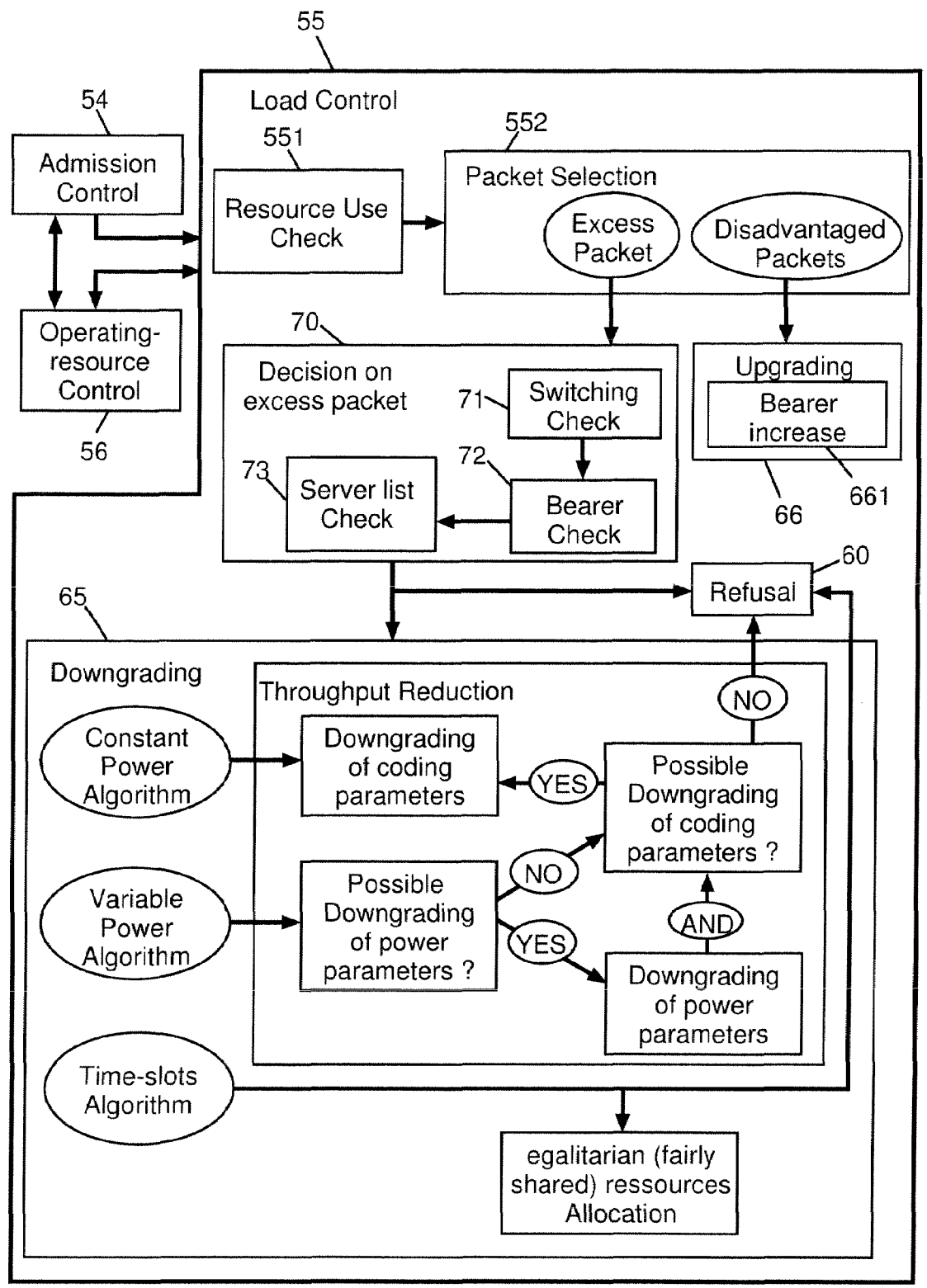
Figure 11:
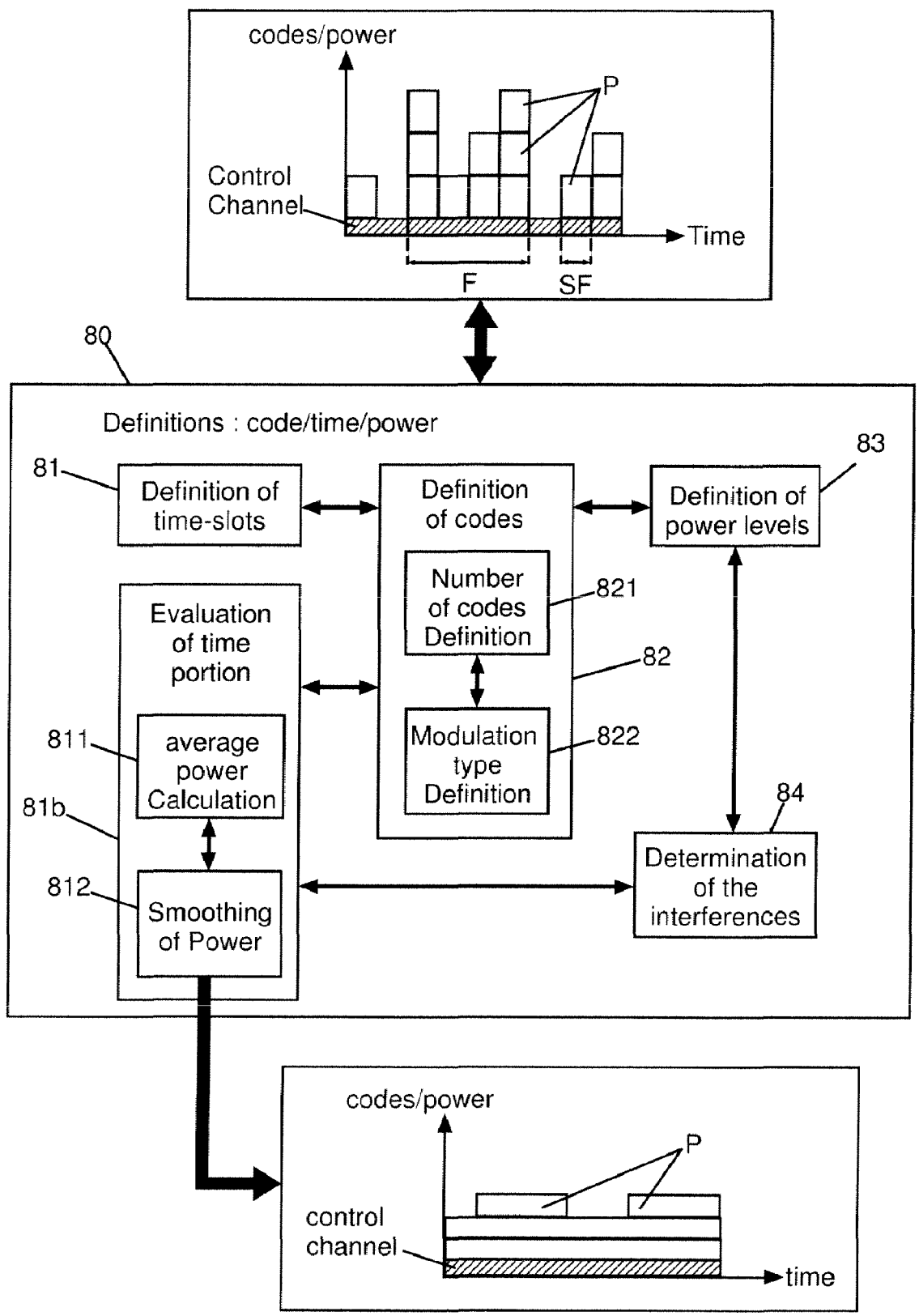

Other particular features and advantages of this present invention will appear more clearly on reading the description that follows, with reference to the appended drawings, in which:

FIG. 1 shows an embodiment of the simulation and optimisation system of the operating resources of a mobile telephone network, and symbolises its operating principles, FIG. 2 shows an embodiment of the simulator of the system of the invention, and details the event management module in particular, FIG. 3 shows an embodiment of the optimisation system, with a detail of a statistical distribution map of the mobile terminals present in the area of coverage of the network during a given time-slice, FIG. 4 shows a detail of an embodiment of a routing path applied to a statistical distribution map, to traverse the different servers of the network, FIGS. 5A, 5B and 5C show a detail of three embodiments of routing paths applied to a statistical distribution map, to traverse the different servers of the network, FIG. 6 shows the main stages of an embodiment of the method according to the invention, FIG. 7 shows the detailed stages implemented in the process of determining a perturbation of the traffic within the network, according to several possible embodiments of the method according to the invention, FIG. 8 shows the detailed stages implemented when controlling the traffic within the network, according to an embodiment of the method of the invention, FIG. 9 shows the detailed stages implemented when controlling the acceptability of the transmission of a new packet, according to an embodiment of the method according to the invention, FIG. 10 shows the detailed stages implemented when controlling the load of the cells that make up the mobile telephone network, according to an embodiment of the method according to the invention, FIG. 11 shows the principle and the detailed stages implemented an embodiment of the method according to the invention.

The present invention concerns a method and a system (1) for the simulation and the optimisation of operating resources of the transmitter/receiver (ER), called servers, whose zones of influence, called cells, constitute the area of coverage of a mobile telephone network (RT). More precisely, the present invention is particularly suitable for managing the resources of modern telephone networks employing the HSDPA and GPRS technologies. The invention is based, firstly, on the use of statistical data corresponding to maps (CR) of statistical traffic distribution and of mobile terminal location in the area of coverage of the network (RT) and, secondly, on the use of algorithms, formed from the network (RT) managers, to control data transmissions required by the mobile terminals present in the area of coverage of the network. A simulated network (RT) is therefore shown in the form of data that represent statistical distribution maps (CR). The method according to the invention therefore includes a preliminary stage for the establishment (51) of a multiplicity of distribution maps (CR). This map (CR) establishment stage (51) is naturally accompanied by the recording of these maps in the storage resources (11) of the optimisation system (1). Use of these distribution maps (CR) allows to reduce the calculation capacity necessary for implementation of the invention. Furthermore, the distribution maps are based on the transmissions (T) required by the mobile terminals present in the network and they therefore allow different types of statistical calculations for each of the parameters relating to the transmissions (T) of these mobile terminals.

In a first embodiment, these data that represent the maps (CR) can be quantitative and qualitative measurements of the traffic, performed beforehand in a real and operational (already deployed) network (RT) by the network managers, and then recorded in storage resources (11) of the system (1).

The quantitative and qualitative measurements of the traffic and of mobile terminal location are effected in the course of time-slices chosen for their statistical significance, and the average data obtained are grouped into statistical distribution maps (CR) of the mobile terminals present in the area of coverage of the network (RT). These distribution maps (CR), each corresponding to one of the chosen time-slices, contain average information concerning the topology of the network (RT), the geographical position of the mobile terminals, and different parameters relating to the use of resources by the mobile terminals during data transmissions.

In a second embodiment, these data that represent the maps (CR) can be data generated by the simulator itself, by means of the statistical laws created and recorded by the network (RT) managers in the storage resources (11) of the system (1). These statistical laws stored in the storage resources (11) can, for example, be data that represent at least one predetermined density of mobile terminals in the area of coverage of the network (RT), at least one random distribution law of these mobile terminals, and at least one random assignment law of data packet (P) transmissions (T) to these terminals. All of these data allow an event-management module (EM) to generate at least one statistical distribution map (CR) including data that represent a simulated traffic level and the location of servers (ER) in the coverage area of the simulated network (RT). The data that represent the traffic then correspond, firstly, to the location of a multiplicity of mobile terminals distributed randomly (according to the random distribution law) in the coverage area of the network (RT) according to the predetermined density and, secondly, to the data packet (P) transmissions (T) required by these terminals assigned randomly (according to the random assignment law) to the different terminals present in the network (RT).

In particular, the simulation is based upon events that are handled by an event-management module (EM). These events consist of variations, within the network, in the current data packet (P) transmissions (T). These transmissions (T), with their different parameters detailed below, are managed by the system of the invention, and constitute a traffic within the network that is in a stable state. Any variation in one of the parameters of the current packet (P) transmissions therefore constitutes a perturbation of the stable state of the network (RT). The perturbation handled by the event-management module (EM) can consists of either a real event detected in an operational network and reproduced in the simulated network, or a fictitious and modeled event in the simulated network. The invention consists of simulating and optimising the operating resources in the simulated network (RT), but either on the basis of real events detected in an operational network, or on the basis of fictitious and modelled events in the simulated network. Implementation of the invention is directed by events that perturb the state of the network and that trigger the simulation in order to allow optimisation of the resources and a return to a stable state (simulation of the event-driven type), but it can also incorporate management of the time (simulation of the time-driven type), by simulating a perturbation of the state of the network at the end of predetermined time intervals for example.

The optimisation system (1), particularly as shown in FIG. 1, therefore includes an event-management module (EM) used to determine at least one perturbation within the simulated network from a distribution map (CR) extracted from the storage resources (11) of the system (1). This event-management module (EM) cooperates with a traffic control module (CT) data transmissions within the network.

This perturbation, whether real or fictitious, activates an operating-resource control module (CL) whose role is to re-establish the stable state of the network by optimising the resources of the cell in which the perturbation occurs and possibly of the neighbouring cells. The operating-resource control module (CL) determines a simulated zone (ZS) within the distribution map (CR), by selecting a set of cells that includes at least the cell in which the perturbation occurs, and uses a routing algorithm stored in the storage resources (11) of the system (1), to determine a routing path (CP) of the simulated zone (ZS) and to successively optimise the resources of the servers (ER) covering the successive cells on the routing path (CP), in ascending order of the distance of these cells in relation to the first cell selected. This operating-resource control module (CL for Convergence Loop) will then travel through the network, following the determined routing path (CP), searching for cells in which the resources are insufficient. For each cell in which the resources are insufficient, the operating-resource control module (CL) will activate at least one of the various modules detailed below to make the resources of the cells converge to a stable state. An admission control module (CAC), using at least one admission control algorithm, enables a decision to be made on the acceptability (the admission in the network) of a transmission (T), and a load control module (LC) uses at least one load control algorithm in order to allow module (CL) also uses at least one power control algorithm to decide on the power to be distributed to the different servers of the network. The use of these different algorithms by the optimisation system (1) enables it to regulate the number of data transmissions in each of the cells in the network (RT), but also to regulate the operating resources such as the power of the servers and the throughput (data rate or data speed through the network) used by the mobile terminals present in their zone of influence (the cell). A first routing path (CP), particularly as shown in FIG. 4, consists of a selection of any cell of the simulated zone (ZS) and then a multiplicity of iterations for the selection of a cell adjacent to the cell selected previously, until all the cells in the simulated zone (ZS) have been successively selected. The stage for the use of the routing algorithm by the operating-resource control module (CL) can be accompanied by a stage for the creation, for each cell in the simulated zone (ZS), of data that represent the neighbouring cells in the simulated zone (ZS), so as to determine a routing path (CP) of each of the cells one after the other. These data can, for example, be loaded at the same time as the data of the distribution map, and they are used to accelerate the processing of the successive cells. In another embodiment, the routing algorithm used by the operating-resource control module (CL) determines concentric circles centered on the cell in which the perturbation occurs, as shown in FIG. 5A. The routing path (CP) then determined by the operating-resource control module (CL) will consist of successive selections of the cells in the simulated zone (ZS) through which these concentric circles pass. As shown in FIG. 5B, this routing algorithm can, for example, allow the operating-resource control module (CL) to divide the simulated zone (ZS) into a multiplicity of zones, called divisions (D), each including at least one cell covered by a server (ER). To this end, the routing algorithm will be used to create a grid for separation of the simulated zone (ZS) into divisions (D), each including an index obtained from the coordinates of the cells, used to locate each of the divisions and to classify them in ascending order of their distance in relation to a central division. The divisions of the simulated zone limitative examples) and the location of the division will be determined by its index, obtained from the coordinates of the cells. Thus, the operating-resource control module (CL) creates data that represent divisions (D) of the simulated zone (ZS), and the use of this routing algorithm can be accompanied by a stage for determining a routing path (CP) that includes at least one vector indicating the path to be followed from one division (D) to the next within the simulated zone (ZS), as shown in FIG. 5C. In another embodiment, the trajectory through the cells in the simulated zone (ZS) can also be accompanied by the creation of data that represent a marker indicating the cells already visited during the passage through the simulated zone by the operating-resource control module (CL), when no vector precisely determines the path to be followed. This routing path will allow successive selections of the divisions (D) of the simulated zone (ZS) through which these concentric circles pass, and successive selections of the cells contained in each of these divisions (D). The data that represent the grid for separation of the simulated zone (ZS) into divisions (D) determined by the operating-resource control module (CL), can include the data that represent the coordinates of the division allowing the operating-resource control module (CL) to determine the location of the cells as well as of the divisions (D) and neighbouring cells, to facilitate the processing of the cells in the different divisions, in particular in the case where at least certain divisions include several cells. In a variant embodiment of the routing path, the cells of a division (D) can be selected in a random manner.

The perturbation determined by the event management module (EM, for Event Manager) can consist of different events, such as (to give non-limitative examples) a new transmission (T) or the end of a current transmission (T). The event-management module (EM), particularly as shown in FIG. 2, can include different modules capable of handling different types of perturbations. For example, an event control module (TE) allows the transmissions (T), the end of transmission (T) and the expiry of transmission (T) timeouts, a mobility simulation module (MS) allows the event-management module (EM) to simulate the mobility of the communicating mobile terminal (2) responsible for the perturbation and a packet scheduling module (SP) allows the event-management module (EM) to manage changes of transmission (T) of current packets (P).

The data that represent the distribution maps (CR) and the different algorithms described in the present invention are held in storage resources (11) of the optimisation system (1), and can therefore be updated easily if necessary. These data, which are necessary for implementation of the invention, can thus be loaded into the processing resources (10) of the optimisation system (1), such as into a working memory (101) of the volatile or very fast access type. This loading of the data allows one to get around the access time to the storage resources (11) and, as a consequence, accelerates processing of the information. These particular features of the invention facilitate its implementation in an operational network, even if the latter is composed of a large number of cells. For example, the invention can be implemented by an application (102) executed on the processing resources (10) of the optimisation system (1). This application (102) controls the processing resources (10) of the optimisation system (1) and allows interoperation between the event-management module (EM), the operating-resource control module (CL), the traffic control module (CT), the admission control module (CAC) and the load control module (LC). The application (102) accesses the storage resources (11) of the optimisation system (1) in order to load the data necessary for the different modules, such as the distribution maps (CR) and the different algorithms The process according to this method of implementation of the invention naturally includes a stage for installation (47) of the application (102) onto the optimisation system (1) by the recording, in the storage resources (11) of the optimisation system (1), of data allowing execution of the application (102) on the processing resources In another embodiment of the invention, the optimisation application (102) is implemented directly in the servers (ER) of the network. The servers of the mobile telephone networks execute a cell planning application (103) on their processing resources, in a manner that is known in itself from prior art. This cell planning application (103) is used to plan (to schedule) the data transmissions required by the mobile terminals. This cell planning application (103) provides a software environment in which the application (102) can be executed. The stage for installation (47) of the application (102) then includes a stage for implementation (48) of the application (102) within this software environment, by the recording, in the storage resources of the server (ER), of data allowing execution of the application for optimisation (102) of the resources within the planning application (103). The server executing this application (102) therefore then becomes an optimisation system (1) according to the invention.

By optimisation system (1) is therefore meant any computer system equipped with the resources described here, by executing the resource optimisation application (102) for example. By communicating mobile terminal is meant any mobile terminal that has resources for communication by mobile telephony. For example, such a terminal can consist of a mobile telephone, and in particular a third generation mobile, but can also be a laptop computer or a personal digital assistant (PDA) equipped with resources for communication by mobile telephony. Any communicating mobile terminal capable of communicating according to the HSDPA and GPRS standards and present in the coverage area of the network (RT) can thus place a request for the transmission of a packet (P) of data and trigger implementation of the invention. Likewise, the invention allows simulation of any type of variation of transmissions (T) (perturbation) within the network, irrespective of the terminal (real or simulated) responsible for this perturbation. The communicating mobile terminal transmitting this request is then called the applicant mobile terminal (2) and the data packet (P) whose transmission it requires must be evaluated by the optimisation system (1) to decide whether this transmission can be accepted or not, in accordance with the average traffic estimated in accordance with the distribution map (CR) corresponding to the time-slice during which this request for transmission has been submitted.

The invention also includes an embodiment in which the optimisation system (1) consists of a computer system (a computer, for example) on which a user (an operator) performs simulations of the traffic according to the distribution maps (CR), for example to test the effectiveness of different algorithms according to different parameters relating to the traffic and/or different parameters assigned to a packet (P) of an applicant terminal (2). The applicant terminal (2) can be selected by the user, either automatically or randomly, from amongst the mobile terminals of one of the distribution maps (CR), also selected by the user automatically or randomly. Interactive resources (12) between the user and the optimisation system (1) allow this user to determine all of the data that is to be used by the application (102). The user can then select a distribution map (CR) and a communicating mobile terminal or determine the parameters from which these selections must be effected automatically by the system (1), from the statistical laws mentioned previously. It can itself also determine a completely virtual packet (P) by entering the parameters required for the simulation. It can also select the simulation parameters for which it wishes to obtain an evaluation by statistical calculation, or program several simulations with different parameters and select the simulation parameters for which it wishes to obtain a comparison. The parameters to be determined, and the results, are presented to the user by means of the interactive resources (12), for example via a graphical interface of the application (102) or of the cell planning application (103).

The processing resources (10) of the optimisation system (1) includes selection resources which access the storage resources (11) of the system (1) in order to extract from them the statistical distribution map (CR) corresponding to the time-slice in the course of which the applicant mobile terminal (2) requires the transmission of a packet (P). These selection resources are implemented in the event-management module (EM) for example, and can consist of random and automatic selection resources of a communicating mobile terminal (2) in a distribution map (CR) extracted from the storage resources (11). They can also consist of selection resources determining a communicating mobile terminal (2) that is selected in accordance with information entered and recorded by a user of the resource optimisation system (1), by means of the interactive resources (12) between the user and the resource optimisation system (1). Finally, these selection resources can consist of operational selection resources of a communicating mobile terminal (2) located automatically in the coverage area of an operational mobile telephone network (RT). Thus, the optimisation system (1) enables its user to determine whether the position of the applicant terminal (2) must be chosen from amongst the positions of the different mobile terminals of this map, or whether it must be selected by the user of the system. Furthermore, the system allows the determination of whether the transmission parameters of the packet (P) of this applicant terminal (2) must either be those of the terminal selected in the map, or parameters determined by the user, or the transmission parameters actually required by the applicant terminal (2) in the case of implementation in an operational network (RT). The resources for the selection of the system then allow the operating-resource control module (CL) to select, from the extracted map (CR), a set of cells defining a simulated zone (ZS) in which the selected applicant mobile terminal (2) is located.

Thus, according to one embodiment of the method according to the invention, the event-management module (EM) executes a first stage for defining (50) a perturbation from at least one statistical distribution map (CR) held in storage resources (11) of the optimisation system (1). As explained above, this definition stage is executed according to the operating mode of the system chosen by the network managers. Then, the operating-resource control module runs a stage for the selection (52) of a set of cells determining a simulated zone (ZS) within the statistical distribution map (CR). By way of an example, FIG. 3 symbolises a distribution map (CR) corresponding to a time-slice of between 15 hours and 17 hours (CR: 15 h-17 h), in which the cells covered by the servers (ER) are shown to be in the form of circles and of ellipses. The simulated zone (ZS) is shown in bold solid lines and contains cells that are shown in solid lines. The cells outside the simulated zone (ZS) are shown by thin dashed lines, and within the simulated zone an active set (AS) of cells, to be detailed later, is shown by bold dashed lines. As mentioned previously, the parameters entered by the user of the system (1), to determine the simulation and the optimisation to be effected, determine the operating modes according to which the system effects the simulation and in particular the selection (52). This stage for the selection (52) of a simulated zone (ZS) can therefore consist of the random and automatic selection, by the system (1) itself, of a communicating mobile terminal (2) present in the coverage area of the network (RT), accompanied by selection of the servers (ER) whose cells can cover the position at which this terminal is located in the distribution map (CR). The user of the system can also determine, in advance, the maximum extent of the simulated zone (ZS), as a number of cells for example. This selection (52) of the simulated zone (ZS) can also be effected by the user of the system (1), and consist of a selection of a communicating mobile terminal (2) present in a distribution map (CR) representing the coverage area of the network (RT), accompanied by a selection of the neighbouring servers (ER), performed either automatically or randomly by the system itself, or by the user if so desired, or automatically according to the location of a communicating mobile terminal (2) that has actually generated a perturbation in an operational network. The data that represent the quantitative and qualitative measurements contained in the selected map (CR), and corresponding to the traffic within the simulated zone (ZS), are then loaded into the resource optimisation system (1), in particular in the working memory (101) for example.

In one embodiment of the invention, the event-management module (EM) includes an event control module (TE). This event control module (TE) allows the determination of requests for new transmissions (T) or the end of transmission (T), due to a communicating mobile terminal actually present in the network or simulated by the system of the invention. This event control module (TE) is also used to manage transmission (T) timeout that give rise to the end of the transmission if they are exceeded and therefore used to determine the expiry of transmission timeout. Thus, the stage of definition (50) of the perturbation by the event-management module (EM) can consist, as particularly shown in FIG. 7, of a request (501) for a new transmission (T), the end (502) of a transmission (T), and the expiry (503) of a transmission timeout (T), with all three managed by the event control module (TE). The event-management module (EM) can also include a packet-scheduling module (SP) that manages changes in the transmission (T) of current packets (P). This packet-scheduling module (SP) is used to determine the events that trigger the perturbation in the network. The stage of definition (50) of the perturbation by the event-management module (EM) can then consist of a stage for changing (505) the packets (P) in the process of transmission (T), handled by a packet scheduling module (SP). Finally, the event-management module (EM) can also include a mobility simulation module (MS) that enables the simulation of any movement, in the coverage area of the network (RT), of a communicating mobile terminal (2) responsible for the perturbation. The stage for defining (for determination) (50) of the perturbation by the event-management module (EM) can consist of a stage for simulating (504) the mobility of the communicating mobile terminal (2) responsible for the perturbation, handled by the mobility simulation module (MS). In one embodiment, this stage for simulating (504) the mobility of the communicating mobile terminal (2) responsible for the perturbation, can consist of modelling a speed of movement of the communicating mobile allows modelling of the level of losses or of the gain due to rapid variations in the strength of the signal ("fading")

as perceived by the mobile communicating terminals (2). This change (506) to the required signal-to-noise ratio can consist, for example, of an adjustment (507) of random variables during modelling of the strength variation of the signal (fading). In another embodiment, this stage for simulating (504) the mobility of the communicating mobile terminal (2) can consist of a change (508) of the location of the communicating mobile terminal (2) in the distribution map (CR), by selection of a neighbouring communicating mobile terminal (2) in the map (CR).

The stages for determination (50) of the perturbation and selection (52) of the simulated zone (ZS) are accompanied by a stage (80) for the definition, by the event-management module (EM), of data that represent at least one parameter relating to the transmission (T) of the packets (P) within each of the cells in the simulated zone (ZS). According to the technology used, that is HSDPA or GPRS, for the transmission (T) of the packet (definition stage can consist of one or more parameter(s) for multiplexing of the packet (P) in time, one or more parameter(s) for multiplexing of the packet (P) by codes and one or more parameter(s) relating to the power required. This stage for defining (for determination) (80) of at least one parameter by the event-management module (EM) includes at least one stage for determination (83) of the power allocated to each of the packets (P) in the course of at least one frame (F) of transmission (T).

In the case of the HSDPA technology, a possible stage for determining (81) slices of time, called time-slots or sub-frames (SF), will be implemented by the packet scheduling module (SP) for time multiplexing of the packets (P) in the course of at least one transmission (T) frame (F). By means of an approximation, detailed later, the invention allows one to dispense with this stage for determining (81) the time-slots or subframes (SF), but the HSDPA technology necessitates at least one stage for determination (82) of codes allowing multiplexing of the packets (P) by codes in the course of at least one transmission (T) frame (F). This determination (82) of codes will generally be accompanied by a stage for determining (821) the number of codes attributed to each of the packets (P) and a stage (822) for determining the type of modulation used for these codes. These stages for determining (81) the time-slots (SF), determining (82) the codes, and determining (83) the power, will be implemented, for each of the packets (P), by the packet scheduling module (SP) used to determine the codes and the time-slots by means of which each of the packets (P) will be transmitted in the course of at least one transmission (T) frame (F), as well as the power allocated to each of the packets (P). As mentioned above, an approximation allows one to dispense with the stage for determining (81) the time-slots (SF). This approximation allows this stage to be replaced by a stage for the evaluation (81b) of a portion (TP) of time occupied by the transmission (T) of each of the packets (P), with no determination of time-slots (SF) but considering only the total time during which each of the packets (P) is transmitted. As particularly shown in FIG. 11, the approximation made consists of a calculation (811) of the average power used during the time for the transmission of each of the packets (P) and of a smoothing (spreading) (812) of the power over the total time portion (TP) occupied by each of the packets (P), through the use, by the event-management module (EM), of at least one algorithm for time distribution of the packets. This algorithm for time distribution of the packets can consist, for example, of an algorithm, called the individual transmission algorithm, according to which a single packet (P) is transmitted in the course of each of the time-slots (SF), then using all of the power available during this time-slot (SF). So as to better distribute the resources used, the algorithm employed can be one called the grouped transmission algorithm, according to which a multiplicity of packets (P) is transmitted during a given time portion (TP), by multiplexing by codes, where these packets (P) then each use a portion of the total available power. In this case, an additional algorithm will allow a stage (814) for the allocation of different time portions (TP) to the different packets (P) transmitted in the course of a transmission (T) frame (F). This additional algorithm can, for example, consist of one called the egalitarian algorithm or "fair-share" algorithm, according to which the time portion (TP) allocated to each of the packets (P) is a function of the total time of the transmission (T) frame (F) divided by the number of packets (P) to be transmitted, or of one called the maximising algorithm, according to which the time portion (TP) allocated to each of the packets (P) is a function of a value of at least one parameter relating to the transmission (T) of the packet (P) divided by the sum of the values of this parameter or these parameters for the other packets (P). Following these determinations, the system allows evaluation of the interference perceived by each of the servers (ER) responsible for the transmission (T) of each of the packets (P) during the time portion (TP) in the course of which they are transmitted. In fact, the stage for determination (83) of the power allocated to each of the packets (P) in the course of at least one transmission (T) frame (F), and the use of the algorithms for time distribution of the packets by the event-management module (EM), allow the execution of a stage for determination (84) of the interference perceived. Thus, a calculation of a signal-to-noise ratio can be effected for each of the packets (P) whose transmission has been determined.

In the case of the GPRS technology, the stage for determination (83) of the power allocated to each of the packets (P) will be accompanied by a stage for determination (85) of a type of time-slot used for the transmission (P) according to the different service types provided by the servers (ER). The type of time-slot used can be a "full rate" time-slot, during which a single packet (P) uses all the bandwidth available, or a "half rate" time-slot. In the case of a packet-switched (PS) packet (P), this time-slot can be a time-slot of the "packet-only" type. Another possible type of time-slot is the mixed time-slot type, allowing the transmission of both packet-switched (PS) packets (P) and circuit-switched (CS) packets (P).

The stage for definition or determination (80) of at least one transmission parameter, like the stage for definition or determination (50) of the perturbation, will be implemented according to the chosen operating mode. Thus, it can be implemented either in a random and automatic manner or from information entered and recorded by a user of the resource optimisation system (1), or from transmission parameters required by a communicating mobile terminal (2) during a transmission request.

The stages for determination (50) of the perturbation and for determination (80) of at least one transmission parameter are accompanied by a stage for controlling (53) the traffic between the servers (ER) of the simulated zone (ZS) and the mobile terminals present in the simulated zone (ZS), implemented by a traffic control module (CT) of the optimisation system (1). This stage for controlling (53) the traffic, as particularly shown in FIG. 8, consists of determining a multiplicity of parameters relating to the services and to the resources used by the mobile terminals present in the simulated zone (ZS). This determination of the parameters of the current transmissions (T) by the traffic control module (CT) results from at least one stage for the extraction (531) of data from a distribution map (CR), in order to extract from them the data that represent the parameters of the transmissions of the mobile terminals present in the simulated zone (ZS). According to the operating mode chosen by the user of the optimisation system (1), this determination can also be the result of a possible stage for the creation (532) of data that represent the parameters of the transmission (T) corresponding to the perturbation. The parameters relating to transmission of the packet (P) of the applicant mobile terminal (2) can necessitate at least one stage for the creation (532) of data, according to the selections of the simulation parameters effected by the user of the optimisation system (1). If the user has himself determined the transmission parameters of the packet (P) of the applicant terminal (2) in order to carry out simulation tests in the optimisation system (1), then the traffic control module (CT) performs the creation (532) of data that represent these transmission parameters of the packet (P) and Incorporates these data into the simulation. If the user has configured the simulation to use the transmission parameters of a communicating mobile terminal selected in the distribution map (CR), then the traffic control module (CT) performs an extraction (531) of data that represent these transmission parameters of the corresponding packet in the distribution map (CR). Finally, if the optimisation system (1) is implemented in a server (ER) of the network, through the execution of the application (102) in the planning application (103) of the server (ER), then the transmission parameters actually required by the applicant mobile terminal (2) will be used for this data creation (532) stage. Thus, for each of the current transmissions in the simulated zone (ZS), the traffic control module (CT) is used to determine the packet transmission sessions, the support transmission path, called bearer (B) and the transmission channels (CH) of these packets. The data extraction (531) stage and the possible data creation (532) stage thus allow a stage for the determination (533) of sessions corresponding to data packet transmissions between the servers (ER) of the simulated zone (ZS) and each of the mobile terminals present. This determination of sessions is accompanied by a determination (534) of the packets transiting in the course of the sessions. A stage for the determination (535) of at least one bearer (B) associated with each of the mobile terminals allows the traffic control module (CT) not only to determine parameters such as the type of the bearer (B), the throughput (rate or speed) of the bearer (B) and the range of authorised power levels, but also to determine the quality of the signal required for the transmission and the transmission channels (CH) used for each of the cells. The term "a support transmission path" used here corresponds to the term "bearer" commonly used to specify the support for a transmission 0 and corresponds to all of the parameters used for the transmission of a packet. These different parameters are necessary for data transmissions between the mobile terminals and the servers (ER) of the mobile telephone network. The present invention advantageously allows these parameters to be controlled and therefore allows the management, possibly in real time, of the operating resources to which these different parameters refer.

When the perturbation determined by the event-management module (EM) is a request for a new transmission (T) by a communicating mobile terminal (2), the call admission control module (CAC) uses at least one admission control algorithm from amongst at least one coding-determined admission control algorithm and at least one time-slot-determined admission control algorithm, held in the storage resources (11) of the system (1). The use of this algorithm then allows a stage for controlling (54) the acceptability for transmission of the packet (P) of the applicant mobile terminal (2), according to the traffic in the different cells of the simulated zone. This stage (54) of call admission control, which can be seen amongst the main stages shown in FIG. 6, has as its objective to decide (545), according to the traffic, between acceptance (61) of transmission of the packet (P) if it can be accepted without the need for any changes, or prior reconfiguration (64) of the parameters of this transmission if it necessitates changes of configuration in order to possibly be accepted, or refusal (60) of the transmission if it cannot be accepted under any circumstances into the simulated zone (ZS). This stage (54) for controlling acceptance, as particularly shown in FIG. 9, consists firstly of the determination (541) of an active set (AS) of cells available within the simulated zone (ZS). This activated set (AS) consists of all of the links available within the network (RT) for transmission of the packet (P). An example of an active set (AS) is symbolises by bold dashed lines in the distribution map (CR) shown in FIG. 3. In the example of FIG. 3, from amongst the cells in the simulated zone, the active set (AS) includes only the cells in the two servers (ER) that are closest to the applicant terminal (2), for example because of the fact that the two other servers in the simulated zone (ZS) cannot increase their power sufficiently to correctly cover the location of the applicant terminal (2) and to offer all of the services normally provided by the network (RT). Determination (541) of the active set (AS) of cells available for transmission of the packet (P) of the applicant terminal (2) is effected by the call admission control (CAC) module, through verification of the (542) of the availability, in the simulated zone (ZS), of at least one parameter from amongst the power, the channels and the type of multiplexing parameters, by code and by time, or the type of time-slots used. This is then followed by classification of the servers (ER) of the active set (AS) according to their contribution (Ec/Io) to the total power of the signals exchanged with the communicating mobile applicant terminal (2). The number of servers (ER) thus selected in the active set (AS) depends on the determination stage (50) previously described, and therefore on the location of the applicant terminal (2), but also on the type of applicant terminal (2) concerned, since the different known mobile terminals accept lists of servers of varying size for their active set (AS). Once this activated set (AS) has been determined, the call admission control (CAC) module effects verification (542) of the availability of resources, in terms of channels and power, for each of the cells of this activated set (AS). A determination of the power required by the transmission channels of the packet (P) for each of the cells then allows verification (543) that this power required by each of the cells does not exceed the maximum power of the bearer (B) determined for transmission of the packet (P) of the applicant terminal (2). Then, a stage for verification (544) that the status of at least one of the cells authorises the acceptance of data transmissions by a new communicating mobile terminal allows the call admission control (CAC) module to execute a decision stage (545) concerning the acceptability for transmission of the packet (P) of the applicant mobile terminal (2). As mentioned previously, this decision (545) consists of a choice, from amongst acceptance (61), refusal (60) or reconfiguration (64) of transmission of the packet (P), in accordance with the conditions necessary for the acceptance of a new transmission. These conditions of acceptability of the new transmission are determined in different special algorithms for controlling the acceptance depending on the type of technology used for transmission of the packet (P). Acceptance (61) for transmission of the packet (P) of the applicant terminal (2) will be decided upon when the conditions necessary for the acceptance of a new transmission have been satisfied. This acceptance (61) then necessitates the selection (58) of a server (ER) for transmission of the packet (P) and selection (59) of a bearer (B) to be used for this transmission (T). Reconfiguration (64) of the packet (P) transmission (T) will be ordered when the conditions necessary for the acceptance of a new transmission have not been satisfied. The storage resources (11) of the optimisation system (1) can hold at least one reconfiguration algorithm, for use by the call admission control (CAC) module, in order to allow modification of the data relating to the bearer (B) of the packet (P) and to increase the chances of acceptance of its transmission. Thus the optimisation system allows an equitable sharing ("fair sharing") of the resources used by the mobile terminals present in the simulated zone (ZS). However, if the traffic within the simulated zone (ZS) does not allow effective reconfiguration (64) of packet (P) transmission (T), then transmission of the packet (P) will be refused (60) by the call admission control (CAC) module. Likewise, if the storage resources (11) of the optimisation system (1) are holding no reconfiguration algorithm, or if the user has configured the system (1) not to use it, then refusal (60) to transmit the packet (P) of the applicant mobile terminal (2) will be decided automatically, as soon as it is known that the conditions necessary for acceptance have not been satisfied.

When transmission of the packet (P) in the process of acceptance uses the HSDPA technology, the call admission control (CAC) module uses at least one coding-determined admission control algorithm. The acceptance (admission) (61) of the packet (P) is then accompanied by allocation of the highest possible initial coding parameters in the server (ER), according to the number of channels available and the power required, and then allocating an initial time portion (TP). In the event of unavailability of such parameters, the call admission control (CAC) module attempts to allocate lower parameters to the packet (P) in order to allow its acceptance. When the number of channels available is insufficient, or when the power required is too high, even for the lowest coding parameters available on the server (ER), the call admission control (CAC) module orders refusal (60) of the transmission (T) of the packet (P) of the applicant mobile terminal (2) by When transmission of the packet (P) in the process of acceptance is using the GPRS technology, then the call admission control (CAC) module uses at least one time-slice-determined admission control algorithm. The decision (545), according to the traffic, concerning the acceptability of the transmission (T) of the packet (P) of the applicant mobile terminal (2) then depends on the switching method used by the packet (P). If the packet in the process of acceptance is using the GPRS technology with circuit-switching (CS), then acceptance (61) is accompanied by the server (ER), or of a time-slot of the half-rate type if the packet (P) is a half-rate call. In order to allow a stage of reconfiguration (64) of the transmission in the event of unavailability of these parameters, the storage resources (11) of the optimisation system (1) can hold at least one reconfiguration algorithm. Firstly, this reconfiguration (64) can result in a search (67) for a call to which a time-slot of the full-rate type is allocated, and then, where appropriate, allocation of a time-slot of the half-rate type to this call, and allocation of the time-slot of the full-rate type thus freed to the new transmission. Secondly, this reconfiguration (64) can also result in a search (68) for a time-slot of the mixed type, and, where appropriate, allocation of this mixed time-slot to the new transmission, and then adaptation of this mixed time-slot to the new circuit-switched (CS) transmission (T). When the conditions necessary for acceptance have not been satisfied, and the storage resources (11) of the optimisation system (1) are storing no reconfiguration algorithm, or the traffic within the simulated zone (ZS) does not allow effective reconfiguration (64) of the transmission (T) of the packet (P), then refusal (60) of the transmission (T) of the packet (P) of the applicant mobile terminal (2) is ordered by the call admission control (CAC) module. If the packet (P) in the process of acceptance is using the GPRS technology with packet switching (PS), then the call admission control (CAC) module, using the time-slot-determined admission control algorithm, effects a search for a only type and time-slots of the mixed type in a bearer (B). If such a transmission block is found, then acceptance (61) of the transmission (T) of the packet (P) of the applicant terminal (2) is accompanied by the allocation of this block to the new transmission. When no transmission block is available for acceptance of the new transmission, then refusal (60) of the transmission (T) of the packet (P) of the applicant mobile terminal (2) is ordered by the call admission control (CAC) module.

The stage for reconfiguration (64) of the transmission (T) of the increase the chances of acceptance of the transmission (T). This stage depends on the algorithm used, and depends on the switching method used for transmission of the packet (P). In a variant embodiment, this reconfiguration stage (64) can force the acceptance (61) of transmission of the packet (P). Following this acceptance (61) of transmission of the packet (P) in a cell that does not have the power required, then the call admission control (CAC) module directly activates the load control module (LC) so that it can execute a stage to control (55) the load of the cells in the simulated zone (ZS). This load control (55) stage is used to reconfigure the current transmissions in the simulated zone (ZS), and then to execute a power control stage (56) to adjust the power levels used on the different servers (ER) of the simulated zone (ZS). Thus, in the event of over-use of resources, the operating-resource control module (CL) will do a tour of the different cells of the simulated zone (ZS) in order to re-adjust the different servers (ER) of the simulated zone (ZS) to a stable state, by regulating the loading of the servers and the power used.

The stage to control (55) the loading of each of the cells in the simulated zone (ZS) can therefore be implemented by the load control module (LC) when it is activated directly by the call admission control (CAC) module, but in general, the load control module (LC) is activated for any variation in the number of packets transmitted within the simulated zone (ZS). Thus, the load control module (LC) can be activated automatically when the use of the resources of a cell is below a minimum threshold or above a maximum threshold. This stage to control (55) the load is used to improve the quality of the transmission packets of the different mobile terminals present in the different cells, in at least one cell in which the perturbation occurs for example, as determined by the event-management module (EM). As an example, the load control module (LC) can be activated by the call admission control (CAC) module in order to adjust the transmissions in the cell in which accepted. Activation of the load control module (LC) can happen automatically when the power required by a channel (CH) for the transmission of a packet (P) increases beyond an authorised maximum. This activation will then result in automatic selection (552)

of this packet as an excess packet (P) and then downgrading (65) of the transmission parameters of this selected excess packet. The load control module (LC) can also be activated by the operating-resource control module (CL) in order to improve transmission in the cells covered by the servers (ER) whose resources are being used excessively, when the operating-resource control module (CL) has detected excessive use and is unable to adjust it because of the configurations selected for transmission of the different packets of the different mobile terminals. The operating-resource control module (CL) of the optimisation system (1) executes a power control stage (56) during a variation in the number of packets transmitted within the simulated zone (ZS). This operating-resource control module (CL) is activated by the call admission control module (CAC) during acceptance (admission) of a new transmission of a packet (P) of an applicant terminal (2), or by the load control module (LC) either when the latter has reorganised the transmissions as explained later, such as following the shut-down of a transmission by a communicating mobile terminal for example, or the abandonment of a packet during a transmission. The power control stage (56) executed by the operating-resource control module (CL) consists of verifying (561) at least one parameter used by the mobile terminals in the cells constituting the simulated zone (ZS), from amongst at least the power and the parameters for multiplexing by codes and by time or the type of time-slots used. Then, the operating-resource control module (CL) effects an adjustment (562) of this parameter or these parameters for at least one server (ER) covering at least one cell in the simulated zone (ZS).

The stage to control (55) the load of each of the cells in the simulated zone (ZS) can be implemented by automatic activation of the load control module (LC), for example when the power required by a channel (CH) for the transmission of a packet increases beyond an authorised maximum. In this case, this load control stage (55) consists of automatic selection (552) of this packet as an excess packet, and then downgrading (65) of the transmission parameters of this selected excess packet. In general, the stage to control (55) the load is implemented in the event of excessive use of the resources of at least one server (ER) of the simulated zone (ZS). The load control module (LC) of the optimisation system (1) then uses at least one load control algorithm, held in the storage resources (11) of the optimisation system (1), from amongst at least one constant-power load control algorithm and at least one variable-power load control algorithm. The use of one of these algorithms allows verification (551) of the resources used, at the level of at least one parameter from amongst the power, the channels used and the parameters for multiplexing by codes and by the time or the type of time-slots employed, in the cells constituting the simulated zone (ZS), to select at least one server (ER) whose resources are being used excessively. The packets are described as excessive (and called excess packets) when they use the maximum of power available or they use a maximum throughput on the transmission channels between the mobile terminals present and the servers (ER). The load control module (LC) then performs a selection (552) of at least one packet from amongst the excess packets, and then a decision (70) between refusal (60) of the selected excess packet and downgrading decision (70) depends on the load control algorithm used by the load control module (LC), and includes a set of preliminary checks used to reorganise the transmission of packets according to their parameters in which the control algorithm is used to establish a priority hierarchy of the different packets. The verifications necessary for the decision stage (70) on transmission of the selected excess packet consists of verifying (71) the switching method, by circuit (CS) or by packet (PS), used by the selected excess packet, verifying (72) the parameters of the bearer (B) used by the selected excess packet, and verifying (73) a list of servers (ER) of the active set (AS) classified according to their contribution (Ec/Io) to the total power of the signals exchanged with the communicating mobile terminal (2). This verification (73) is used to determine whether there exists another server (ER) capable of allowing transmission of the selected excess packet, when the power of the signal supplied by a server (ER) is insufficient.

In the case of a packet (P) using the HSDPA technology, when the load control module (LC) uses a constant-power load control algorithm, the decision stage (70) between refusal (60) of the selected excess packet and downgrading (65) of the transmission parameters of the selected excess packet, consists of holding constant the power initially allocated to the packets (P) during the whole period of their transmission (T) and downgrading (65) of the parameters for multiplexing by codes in accordance with the instantaneous signal-to-noise ratio. Thus, the throughput of the selected excess packet is reduced while keeping the signal-to-noise ratio above its required value. If the required signal-to-noise ratio cannot be maintained, refusal (60) of the selected excessive packet (P) is ordered by the load control module (LC). When the load control module (LC) uses a variable-power load control algorithm, the decision stage (70) can be accompanied by a possible reduction of the power parameters allocated to the packets. So as to reduce the throughput of the selected excess packet while keeping the signal-to-noise ratio above its required value, downgrading (65) of the parameters of multiplexing by code the code-type multiplexing parameters) initially allocated to the packets (P) will also be accompanied by downgrading of the power parameters, in accordance with the instantaneous signal-to-noise ratio. If the power cannot be regulated, then only the code-type multiplexing parameters will be declassified, in accordance with the instantaneous signal-to-noise ratio, so as to reduce the throughput of the selected excess packet while keeping the signal-to-noise ratio above its required value. If the required signal-to-noise ratio cannot be maintained in these conditions, then the selected excessive packet (P) will be refused.

In the case of a packet (P) using the GPRS technology, the load control module (LC) uses at least one time-slot load control algorithm. The loading control stage (55) can thus be implemented, for example, when a mixed time-slot is used only for the transmission of a circuit-switched packet (CS), while it normally allows the transmission of both packet-switched packets (PS) and circuit-switched packets (CS). Likewise, this load control stage can be implemented when a packet (P) is abandoned. The time-slot load control algorithm allows the allocation of egalitarian (fairly shared) resources to all of the packets (P) in the process of transmission, according to the capacity of the communicating mobile terminals (2) responsible for these transmissions (T). If the number of packets being transmitted exceeds a predetermined value, then this load control stage results in a possible refusal (60) of the most recent packet.

The load control stage (55) can be implemented during a reduction in the use of the resources of at least one server (ER) of the simulated zone (ZS). It then consists of verifying (551) the resources used, at the level of at least one parameter from amongst the power, the channels used and the parameters for multiplexing by codes and by time or the type of time-slots used. This verification (551) in the simulated zone (ZS) allows the detection of at least one server (ER) that as unused resources, and then selection (552) of at least one packet using a minimum throughput on the transmission channels of the server (ER) that has unused resources. This packet is then called disadvantaged. Then, upgrading (66) of the transmission parameters of the selected disadvantaged packet, by increasing (661) the value of at least one parameter of the bearer (B) used by this packet, allows a satisfactory operating level to be attained, as determined in the load control algorithm.

In this embodiment, where the load control module (LC) includes an algorithm for increasing the use of the operating resources when they are underused, the stage to control (55) the loading is associated with a stage for detection of any oscillations between two values of at least one parameter of the bearer (B) used by a packet (P) in the process of reconfiguration by the load control module (LC). In fact, the possible increasing and decreasing of the parameters of the transmission (T) by the load control module (LC) are conflicting and can give rise to an oscillation of this parameter between two values each leading to one of these two types of regulation. A stage for detection of an oscillation due to these two conflicting stages allows the oscillation to be stopped, for example by attributing to this parameter the minimum value attained by the oscillation.

It can therefore be seen that the objectives set by the invention have been attained, allowing effective control to be exercised over all the resources of the telephone network and allowing supervision of the quality of the data transmissions effected by the mobile terminals within the network. The invention obviously allows the recording of all operations performed and of the transmissions achieved by the different mobile terminals, possibly with a display of the results of simulation and/or optimisation of the resources, such as the average throughput delivered to the mobile terminals or the average quality of the signal in the course of the transmissions, for example.

It must be obvious to all who are well versed in the subject that this present invention allows embodiments in many other specific forms without moving outside of the area of application of the invention as claimed. As a consequence, the present embodiments must be considered as illustrations only, but can be modified in the area specified by the scope of the attached claims, and the invention must not be limited to the details given above.

The invention claimed is:

1. A method for simulating and optimising the operating resources available in a coverage area of a mobile telephone network consisting of a set of zones of influence, called cells, of a plurality of transmitters/receivers, called servers, whose operating resources depend on the transmission of data sets, called packets, required by at least one communicating mobile terminal, called the applicant terminal, present in their zone of influence, wherein, firstly, it is implemented by processing resources of at least one resource optimisation system and, secondly, it includes the following stages:

definition, by an event-management module of the optimisation system, of a variation, called a perturbation, of at least one transmission of packets required within the network, where this perturbation is determined from at least one statistical distribution map held in storage resources of the optimisation system and including data that represent the data packet transmissions of a plurality of mobile terminals present in a given geographical zone during a given time-slice, selection of a set of cells that includes at least the cell in which the perturbation occurs, and that defines a simulated zone within the distribution map by means of an operating-resource control module, and then use of a routing algorithm, ran by the operational control module, to determine a routing path of the simulated zone, and to successively optimise the resources of the servers covering the successive cells on the routing path, definition, by the event-management module of data that represent at least one parameter relating to the transmission of the packets within each of the cells in the simulated zone, from amongst at least parameters of time-multiplexing of the packet, code-multiplexing of the packet, and power required.

2. A method according to claim 1, wherein the stage for definition of at least one parameter from the time-multiplexing of the packet, the code-multiplexing of the packet and the power required, by the event-management module, includes at least one of the following stages:

determination of time-slices, called time-slots or sub-frames, allowing multiplexing in time of the packets in the course of at least one frame of transmission, determination of codes allowing multiplexing by codes of the packets in the course of at least one frame of transmission, determination of the power allocated to each of the packets in the course of at least one frame of transmission, determination of a type of time-slot used for the transmission of packets according to the different service types provided by the servers, where this type of time-slot is either a "full-rate" time-slot, or a "half-rate" time-slot, or a "packet-only" time-slot, or a "mixed" packet and circuit time-slot.

3. A method according to claim 2, wherein the stage of determination of codes includes a stage for determining the number of codes attributed to each of the packets and a stage for determining the type of modulation used for these codes.

4. A method according to claim 2, wherein the stages for determining the time-slots, for determining the codes and for determining the power, are implemented, for each of the packets, by a packet scheduling module used to determine the codes and the time-slots by means of which each of the packets will be transmitted in the course of at least one frame of transmission, as well as the power allocated to each of the packets.

5. A method according to claim 2, wherein the stage for determining the time-slots is replaced by a stage for the evaluation of a portion of time occupied by the transmission of each of the packets, with no determination of time-slots but considering only the total time during which each of the packets is transmitted.

6. A method according to claim 5, wherein the stage for the evaluation of the time portion occupied by the transmission of each of the packets is based upon an approximation that consists of a calculation of the average power used during the time for the transmission of each of the packets, and of a smoothing of the power over the total time portion occupied by each of the packets, through the use, by the event-management module, of at least one algorithm from amongst the following algorithms for time distribution of the packets:

an individual transmission algorithm, according to which a single packet is transmitted in the course of each of the time-slot, then using all of the power available during this time-slot, a grouped transmission algorithm, according to which a plurality of packets is transmitted during a given time portion, by multiplexing by codes, these packets each using a portion of the total available power.

7. A method according to claim 6, wherein it includes a stage for determination of the interference perceived by each of the servers responsible for the transmission of each of the packets during the time portion in the course of which they are transmitted, where this stage is implemented by means of the stage for determination of the power allocated to each of the packets in the course of at least one frame of transmission and by use of the algorithms for time distribution of the packets by the event-management module, with this determination of the perceived interference allowing the calculation of a signal-to-noise ratio for each of the packets.

8. A method according to claim 6, wherein the use of the grouped transmission algorithm by the event-management module is accompanied by a stage for the allocation of different time portions to the different packets transmitted in the course of a frame of transmission, by the use of an algorithm from amongst the following algorithms for the allocation of a time portion:

A "fair-share" algorithm, according to which the time portion allocated to each of the packets is a function of the total time of the frame of transmission divided by the number of packets to be transmitted, a maximising algorithm, according to which the time portion allocated to each of the packets is a function of a value of at least one parameter relating to the transmission of the packet divided by the sum of the values of this parameter or these parameters for the other packets.

9. A method according to claim 1, wherein it includes a preliminary stage for the establishment of at least one distribution map including data that represent the traffic and the location of servers in the coverage area of the network, where these data representing the traffic are quantitative and qualitative measurements of the location of a plurality of mobile terminals and servers operating in the coverage area of the network and of the data packet transmissions effected in the course of time-slices chosen for their statistical significance, where the data corresponding to these measurements are held in the storage resources of the optimisation system.

10. A method according to claim 1, wherein it includes a stage for the establishment of at least one distribution map including data that represent the traffic and the location of servers in the coverage area of the network, with the data that represent the traffic being generated by the event-management module and representing, firstly, the location of a plurality of mobile terminals distributed randomly in the coverage area of the network at a predetermined density and, secondly, the data packet transmissions required by these terminals assigned randomly to the different terminals present in the network, from random laws stored in the storage resources of the optimisation system.

11. A method according to claim 1, wherein it includes a stage for the recording, in the storage resources of the optimisation system, of at least one routing algorithm allowing the operating-resource control module to determine a routing path consisting of the selection of any cell in the simulated zone and then a plurality of iterations for the selection of a cell adjacent to the cell selected previously, until all the cells in the simulated relation to the first cell selected.

12. A method according to claim 1, wherein it includes a stage for the recording, in the storage resources of the optimisation system, of at least one routing algorithm determining concentric circles centred on the cell in which the perturbation occurs and allowing the operating-resource control module to determine a routing path consisting of successive selections of the cells in the simulated zone through which these concentric circles pass in ascending order of the distance of these cells in relation to the first cell selected.

13. A method according to claim 1, wherein the stage for the use of the routing algorithm by the operating-resource control module is accompanied by a stage for the creation of data that represent a grid for separation of the simulated zone into divisions, each including an index obtained from the coordinates of the cells, used to locate each of the divisions and to classify them in ascending order of their distance in relation to a central division.

14. A method according to claim 13, wherein the stage for the use, by the operating-resource control module, of a routing algorithm results in the determination of concentric circles centred on the cell in which the perturbation occurs, and is accompanied by a stage for determining a routing path that includes at least one vector indicating the path to be followed from one division to the next within the simulated zone, in order to allow successive selections of the divisions of the simulated zone through which these concentric circles pass, and successive selections of the cells contained in each of these divisions in ascending order of their distance in relation to a central division.

15. A method according to claim 13, wherein the data that represent the grid for separation of the simulated zone into divisions includes data that represent the coordinates of the division allowing the operating-resource control module to determine the location of the cells, as well as the divisions and neighbouring cells.

16. A method according to claim 1, wherein the stage for the use of the routing algorithm by the operating-resource control module is accompanied by a stage for the creation, for each cell in the simulated zone, of data that represent the neighbouring cells in the simulated zone, so as to determine a routing path for each of the cells, one after the other.

17. A method according to claim 16, wherein the routing path in the cells within a division is determined in a random manner.

18. A method according to claim 1, wherein the stage for the use of the routing algorithm by the operating-resource control module is accompanied by the creation, for each cell in the simulated zone, of data that represent a marker indicating the cells already visited during the passage through the simulated zone by the operating-resource control module.

19. A method according to claim 1, wherein the stage for definition of the perturbation consists of the random and automatic selection of a communicating mobile terminal in a distribution map extracted from the storage resources of the optimisation system and in that the stage for the selection of a set of cells determining a simulated zone within the distribution map consists of selecting at least one server whose cell can cover the location at which this terminal is located in the distribution map.

20. A method according to claim 1, wherein the stages for definition of the perturbation and for selection of a set of cells determining a simulated zone within the distribution map, consist of the selection of a communicating mobile terminal present in the coverage area of the network and of at least the servers whose cells can cover the position at which this terminal is located in the distribution map, from information entered and recorded by a user of the resource optimisation system, by means of interactive resources between the user and the resource optimisation system.

21. A method according to claim 1, wherein, firstly, the stage for definition of the perturbation is implemented during a request for the transmission of a data packet by an applicant mobile terminal present in the coverage area of an operational mobile telephone network, and consists of the location of the communicating mobile applicant terminal in the coverage area of the network and identification of the type of transmission that it requires and, secondly, the stage for the selection of a set of cells at least one server whose cell can cover the location at which this terminal is located in the distribution map.

22. A method according to claim 1, wherein the stage for definition of data that represent at least one parameter relating to the transmission of the packets is implemented by the resource optimisation system, either in a random and automatic manner, or from information entered and recorded by a user of the resource optimisation system, or from transmission parameters required by a communicating mobile terminal during a transmission request.

23. A method according to claim 1, wherein the stage for definition of the perturbation by the event-management module includes at least one of the following stages:
   a request for a new transmission, handled by an event control module,
   the ending of a transmission, handled by the event control module,
   the expiry of a transmission timeout, handled by the event control module,
   simulation of the mobility of the communicating mobile terminal responsible for the perturbation, handled by a mobility simulation module,
   changing of the transmissions of current packets, handled by a packet-scheduling module.

24. A method according to claim 23, wherein the stage for simulating the mobility of the communicating mobile terminal responsible for the perturbation consists of one of the following stages:
   modelling a speed of movement of the communicating mobile terminal by changing the required signal-to-noise ratio, which allows modelling of the level of losses or of the gain due to variations in the strength of the signal perceived by the mobile communicating terminals, or
   changing the location of the communicating mobile terminal in the distribution map by selection of a neighbouring communicating mobile terminal in the map.

25. A method according to claim 1, wherein it includes a stage for controlling the traffic between the servers of the simulated zone and the mobile terminals present in the simulated zone, implemented by a traffic control module of the optimisation system determining, for each of the current transmissions, sessions for the transmission of packets, the support transmission path, called bearer and the transmission channels of these packets, this stage being accompanied by at least one of the stages for determination of the multiplexing and power parameters.

26. A method according to claim 25, wherein the stage for the control of traffic by the traffic control module of the optimisation system consists of determining a plurality of parameters relating to the services and to the resources used by the mobile terminals present in the simulated zone, where this determination results from at least one stage for the extraction of data that represent these parameters, from a distribution map, and of a possible stage for the creation of data that represent these parameters, from information entered by a user of the optimisation system, so as to allow at
   determination of sessions corresponding to transmissions of data packets between the servers of the simulated zone and each of the mobile terminals present, with determination of the packets transiting in the course of the sessions;
   determination of at least one bearer associated with each of the transmissions of each of the mobile terminals, with determination of at least one parameter from the parameters relating to the type of the bearer, the throughput (data rate) of the bearer, the quality of the signal required, the transmission channels used for each of the cells, and the range of authorised power levels.

27. A method according to claim 2, wherein it includes a stage for controlling the acceptability of the transmission of this packet, by a call admission control module of the resource optimisation system performing a determination of a set, called the active set, of cells available within the simulated zone, by verification of the availability, in the simulated zone, of at least one parameter from amongst the power, the channels and the parameters for multiplexing by codes and by time or the type of time-slots employed, and then classification of the servers of the active set according to their contribution (Ec/Io) to the total power of the signals exchanged with the communicating mobile terminal, with the call admission control module then making a decision, according to the traffic, about the acceptability of the transmission of this packet via at least one support transmission path, called the bearer, and at least one channel for transmission of the packet via at least one server covering one of the cells in the active set.

28. A method according to claim 2, wherein it includes an operating-resource control stage, implemented by the operating-resource control module of the optimisation system during a variation in the number of packets transmitted within the simulated zone, and consisting of verifying at least one parameter used by the mobile terminals in the cells constituting the simulated zone from amongst at least the power and the parameters for multiplexing by codes and by time or the type of time-slots employed, and then adjusting this parameter or these parameters for at least one server covering at least one cell in the simulated zone.

29. A method according to claim 2, wherein it includes a load control stage for each of the cells in the simulated zone, implemented by a load control module of the optimisation system, in the event of excessive use of the resources of at least one server of the simulated zone, consisting of the use of at least one load control algorithm from amongst at least one constant-power load control algorithm and at least one variable-power load control algorithm held in the storage resources of the optimisation system and including the following stages:
   verification of the resources used, at the level of at least one parameter from amongst the power, the channels used and the multiplexing parameter by codes and by the time or the type of time-slots employed, in the cells constituting the simulated zone, to select at least one server whose resources are being used excessively;
   selection of at least one packet from amongst the packets, called excess packets, using the maximum of power or using a maximum throughput (data speed rate) on the transmission channels between the mobile terminals present and the server whose resources are being used excessively;

a decision between refusal of the selected excess packet and downgrading of the transmission parameters of the selected excess packet.

30. A method according to claim 29, wherein the decision stage between refusal of the selected excess packet and downgrading of the transmission parameters of the selected excess packet, during the load control stage by the load control module, depends on the load control algorithm used and includes the following stages:

verification of the switching method, by circuit or by packet, used by the selected excess packet;

verification of the parameters of the bearer used by the selected excess packet;

verification of a list of servers of the active set classified according to their contribution (Ec/Io) to the total power of the signals exchanged with the communicating mobile terminal, to determine whether there exists another server capable of allowing transmission of the selected excess packet, when the power of the signal supplied by a server is insufficient.

31. A method according to claim 29, wherein the decision stage between refusal of the selected excess packet and downgrading of the transmission parameters of the selected excess packet, during the stage to control the loading, by the use of at least one constant-power load control algorithm, consists of holding constant the power initially allocated to the packets during the whole period of their transmission, and downgrading of the parameters for multiplexing by codes in accordance with the instantaneous signal-to-noise ratio, so as to reduce the throughput of the selected excess packet while keeping the signal-to-noise ratio above its required value, or in a refusal of the selected excessive packet if the required signal-to-noise ratio cannot be maintained.

32. A method according to claim 29, wherein the decision stage between refusal of the selected excess packet and downgrading of the transmission parameters of the selected excess packet, during the load control stage, by the use of at least one variable-power load control algorithm, consists:

either of downgrading of both the code-type multiplexing parameters initially allocated to the packets and the power parameters, in accordance with the instantaneous signal-to-noise ratio, so as to reduce the throughput of the selected excess packet while keeping the signal-to-noise ratio above its required value, or, when the power cannot be regulated, of downgrading only the parameters for multiplexing by codes in accordance with the instantaneous signal-to-noise ratio, so as to reduce the throughput of the selected excess packet while keeping the signal-to-noise ratio above its required value, or of refusal of the selected excessive packet if the required signal-to-noise ratio cannot be maintained.

33. A method according to claim 2, wherein it includes a stage to control the load of each of the cells in the simulated zone, implemented by a load control module of the optimisation system, by the use of at least one time-slot load control algorithm, either when a mixed time-slot is used only for the transmission of a circuit-switched packet while it normally allows either the transmission of both packet-switched packets and circuit-switched packets, or when a packet is abandoned, where this load control stage consists of allocating fairly shared resources to all of the packets in the process of transmission, according to the capacity of the communicating mobile terminals responsible for these transmissions, and possible refusal of the most recent packet if the number of packets being transmitted exceeds a predetermined value.

34. A method according to claim 2, wherein it includes a stage to control the load of each of the cells in the simulated zone, implemented by a load control module of the optimisation system, during a reduction in the use of the resources of at least one server of the simulated zone, consisting of the use of at least one load control algorithm held in the storage resources of the optimisation system, and including the following stages:

verification of the resources used, at the level of at least one parameter from amongst the power, the channels used and the parameters for multiplexing by codes and by time or the type of time-slots employed, in the simulated zone, to detect at least one server that has unused resources;

selection of at least one packet from amongst the packets, called disadvantaged packets, using a minimum throughput on the transmission channels of the server that has under-used resources;

upgrading of the transmission parameters of the selected disadvantaged packet, by increasing the value of at least one parameter of the bearer used by this selected disadvantaged packet until a satisfactory operating level is attained, as determined in the load control algorithm.

35. A method according to claim 34, wherein the stage to control the loading of each of the cells in the simulated zone is associated with a stage for the detection of any oscillations between two values of at least one parameter of the bearer used by a packet in the process of reconfiguration by the load control module and, where appropriate, attributing the minimum value attained by the oscillation to this parameter.

36. A method according to claim 29, wherein the stage to control the load of each of the cells in the simulated zone is implemented by activation of the load control module by the operating-resource control module, in order to improve the quality of the transmission of the packets of the different mobile terminals present in at least one cell in which the perturbation occurs, as determined by the event-management module.

37. A method according to claim 29, wherein the stage to control the load of each of the cells in the simulated zone is implemented by automatic activation of the load control module, when the power required by a channel for the transmission of a packet increases beyond an authorised maximum, and consists of automatic selection of this packet as an excess packet and then downgrading of the transmission parameters of this selected excess packet.

38. A method according to claim 27, wherein the stage for controlling the acceptability of the transmission of the packet of the applicant mobile terminal consists of the use, by the call admission control module, of at least one admission control algorithm from amongst at least one coding-determined admission control algorithm and at least one time-slot-determined admission control algorithm, held in the storage resources of the optimisation system and includes the following stages:

determination of the active set of cells available for the transmission of the packet of the applicant terminal, by measurement and classification of a plurality of servers of the simulated zone, whose number depends on the location and the type of the applicant terminal;

verification of the availability of resources, for each of the cells in the simulated zone, at the level of at least one parameter from amongst the power, the channels and the parameters for multiplexing by codes and by time or the type of time-slots employed, and then classification of the servers of the active set according to their contribution (Ec/Io) to the total power of the signals exchanged with the communicating mobile terminal;

determination of the power required by the transmission channels of the packet for each of the cells, and verification that this power required by each of the cells does not exceed the maximum power of the bearer determined for the transmission of the packet of the applicant terminal;

verification that the status of at least one of the cells allows the acceptance of transmissions of data by a new communicating mobile terminal.

39. A method according to claim 5, wherein the use, by the call admission control module, of at least one coding-determined admission control algorithm results in a decision, according to the traffic, on the acceptability of the transmission of the packet of the applicant mobile terminal, where this decision consists of one of the following stages:

acceptance of the transmission of the packet of the applicant terminal, when the conditions necessary for the acceptance of a new transmission have been satisfied, after selection of a server for the transmission of the packet and selection of the bearer to be used for this transmission, with allocation of the highest possible initial coding parameters in the server, according to the number of channels available and the power required, and then allocation of an initial time portion;

refusal of the transmission of the packet of the applicant mobile terminal by the server, when the number of channels available is insufficient or when the power required is too high, even for the lowest coding parameters available on the server.

40. A method according to claim 38, wherein the use, by the call admission control module, of at least one time-slot-determined admission control algorithm, results in a decision, according to the traffic, on the acceptability of the transmission of the packet of the applicant mobile terminal, where this decision consists of one of the following stages when the packet is using circuit-switching:

acceptance of the transmission of the packet of the applicant terminal, when the conditions necessary for the acceptance of a new transmission have been satisfied, after selection of a server for the transmission of the packet and selection of the bearer to be used for this transmission, with allocation of a time-slot of the full-rate type if such a time-slot is available on the server or allocation of a time-slot of the half-rate type if the packet is a half-rate call;

reconfiguration by the use of at least one reconfiguration algorithm of the transmission of data when the conditions necessary for the acceptance of a new transmission have not been satisfied and the storage resources of the optimisation system are holding at least one reconfiguration algorithm, in order to allow a modification of the data relating to the bearer, and to increase the chances of acceptance of the transmission;

refusal of the transmission of the packet of the applicant mobile terminal, when the conditions necessary for acceptance have not been satisfied and the storage resources of the optimisation system are storing no reconfiguration algorithm, or the traffic within the simulated zone does not allow effective reconfiguration of the transmission of the packet.

41. A method according to claim 40, wherein the stage for reconfiguration by the use of at least one algorithm for reconfiguration of the transmission of the packet, implemented by the call admission control module when the conditions necessary for the acceptance of a new transmission, determined by the time-slot-determined admission control algorithm, have not been satisfied, and the storage resources of the optimisation system are holding at least one reconfiguration algorithm, results in:

either a search for a call to which a time-slot of the full-rate type is allocated, and then, where appropriate, allocation of a slice of the half-rate type to this call and allocation to the new transmission of the time-slot of the full-rate type thus freed;

or a search for a time-slot of the mixed type, and, where appropriate, allocation of this mixed time-slot to the new transmission, and then adaptation of this mixed time-slot to the new circuit-switched transmission.

42. A method according to claim 38, wherein the use, by the call admission control module, of at least one time-slot-determined admission control algorithm results in a decision, according to the traffic, on the acceptability of the transmission of the packet of the applicant mobile terminal, where this decision consists of one of the following stages when the packet is using packet-switching:

the search for a transmission block consisting of a combination of time-slots of the packet-only type and time-slots of the mixed type in a bearer and then, where appropriate, acceptance of the transmission of the packet of the applicant terminal and allocation of this block to the new transmission;

the refusal of the transmission of the packet of the applicant mobile terminal, when no transmission block is available for acceptance of the new transmission.

43. A method according to claim 1, wherein it is implemented by an application for the simulation and optimisation of resources, executed on the processing resources of the resource optimisation system and controlling the processing resources and the interoperability of the traffic control module, of the admission control module, of the load control module and of the operating-resource control module, and accessing the storage resources of the optimisation system in order to load the data necessary for the different modules, where the process includes a stage for installation of the application on the optimisation system by the recording, in the storage resources of the optimisation system, of data allowing execution of the application on the processing resources of the optimisation system.

44. A method according to claim 43, wherein the stage for installation of the application on the optimisation system includes a stage for implementation of the optimisation application within a software environment supplied by a cell planning application executed on the processing resources of at least one server within the coverage area of the network, by the recording, in storage resources of the server, of data allowing execution of the application for optimisation of the resources within the cell planning application of the server which thus constitutes an optimisation system.

45. A method according to claim 1, wherein the stages for definition of the perturbation and selection of a simulated zone are accompanied by a stage for loading into a working memory, of the volatile or very fast access type, of the resource optimisation system, of at least certain data stored in the storage resources of the optimisation system.

* * * * *